US012749863B2

(12) United States Patent
Karim et al.

(10) Patent No.: US 12,749,863 B2
(45) Date of Patent: Sep. 29, 2026

(54) LASER PULSE SELECTION AND ENERGY LEVEL CONTROL

(71) Applicant: Alcon Inc., Fribourg (CH)

(72) Inventors: John Hossein Karim, Cypress, CA (US); Christopher Andrew Guerrero, Laguna Niguel, CA (US); Adela Apostol, Laguna Hills, CA (US); Daniel Castro, Lake Forest, CA (US); Reza Khazaeinezhad, Lake Forest, CA (US); Alireza Malek Tabrizi, Irvine, CA (US); Corey Stewart, Irvine, CA (US); Zenon Witowski, Rancho Santa Margarita, CA (US)

(73) Assignee: Alcon Inc., Fribourg (CH)

( * ) Notice: Subject to any disclaimer, the term of this patent is extended or adjusted under 35 U.S.C. 154(b) by 1022 days.

(21) Appl. No.: 17/812,019

(22) Filed: Jul. 12, 2022

(65) Prior Publication Data

US 2023/0178953 A1 Jun. 8, 2023

Related U.S. Application Data

(60) Provisional application No. 63/222,521, filed on Jul. 16, 2021.

(51) Int. Cl.
*H01S 3/00* (2006.01)
*A61F 9/008* (2006.01)
*G03B 27/72* (2006.01)

(52) U.S. Cl.
CPC ............ *H01S 3/0085* (2013.01); *G03B 27/72* (2013.01)

(58) Field of Classification Search
CPC ............................... H01S 3/0085; A61F 9/008
See application file for complete search history.

(56) References Cited

U.S. PATENT DOCUMENTS 4,524,271 A * 6/1985 Parker ..................... A61F 9/008 250/233
4,571,712 A * 2/1986 Romano ................ G11B 7/094
(Continued)

FOREIGN PATENT DOCUMENTS

CN 102749786 B 4/2015
DE 3333575 C2 9/1992
(Continued)

OTHER PUBLICATIONS

Anonymous: "Kuhnke Laser Shutter DS200x8", Kendrions-Technical information, Feb. 21, 2017, XP002806981, Retrieved from the Internet: URL: https: //www.kendrion.com/fileadmin/user_upload/Downloads/Brochures_and_Flyers/Electromagnets_Actuators/brochure-lasershutter-ds200x8-kendrion-kuhnke.pdf [retrieved on Jul. 1, 2022].
(Continued)

*Primary Examiner* — Xinning(Tom) Niu
(74) *Attorney, Agent, or Firm* — Patterson + Sheridan, LLP

(57) ABSTRACT

Systems and methods are disclosed for selectively passing or blocking laser electromagnetic energy. A laser system comprises a shutter, whereby when the shutter is rotated one or more open areas of the shutter and one or more solid areas of the shutter are alternately positioned in a path of electromagnetic radiation emitted by the laser. The shutter may operate in different modes, including allowing all laser pulses to pass through in whole or in part, blocking all laser pulses from passing through, and alternately allowing and blocking laser pulses. In some embodiments, the shutter is controlled to allow only a part of each selected laser pulse to pass through. A laser system comprises a waveplate rotatable into different positions corresponding to different operating modes. The different operating modes may include
(Continued)

allowing part and blocking part of the laser electromagnetic radiation.

15 Claims, 17 Drawing Sheets

(56) References Cited

U.S. PATENT DOCUMENTS

| | | | | | |
|---|---|---|---|---|---|
| 5,099,147 | A * | 3/1992 | Gregor | H01S 3/30 359/327 |
| 5,225,884 | A | 7/1993 | Stark et al. | |
| 6,055,259 | A | 4/2000 | Frey et al. | |
| 6,067,311 | A | 5/2000 | Morton et al. | |
| 6,080,148 | A | 6/2000 | Damasco | |
| 6,156,030 | A | 12/2000 | Neev | |
| 6,334,611 | B1 * | 1/2002 | Koo | B65H 39/11 270/58.18 |
| 6,404,787 | B1 * | 6/2002 | Unternahrer | H01S 3/0057 372/25 |
| 7,479,138 | B2 | 1/2009 | Hindi et al. | |
| 7,630,418 | B2 | 12/2009 | Franjic et al. | |
| 7,696,466 | B2 | 4/2010 | Rizoiu et al. | |
| 8,025,659 | B2 | 9/2011 | Bischoff et al. | |
| 8,029,501 | B2 | 10/2011 | Miller | |
| 8,064,043 | B2 * | 11/2011 | Irie | G03F 7/7055 355/71 |
| 8,279,901 | B2 | 10/2012 | Karavitis | |
| 8,506,559 | B2 | 8/2013 | Raksi | |
| 8,518,030 | B2 | 8/2013 | Holliday | |
| 8,652,122 | B2 | 2/2014 | Bischoff et al. | |
| 8,920,407 | B2 | 12/2014 | Raksi et al. | |
| 9,044,303 | B2 | 6/2015 | Kurtz et al. | |
| 9,054,479 | B2 | 6/2015 | Karavitis | |
| 9,660,412 | B2 | 5/2017 | Vogler et al. | |
| 9,724,235 | B2 | 8/2017 | Vogler et al. | |
| 9,755,393 | B2 | 9/2017 | Vogler et al. | |
| 9,931,447 | B2 | 4/2018 | Layser | |
| 10,512,586 | B1 | 12/2019 | Lee | |
| 10,624,786 | B2 | 4/2020 | Wysopal et al. | |
| 10,702,338 | B2 | 7/2020 | Shazly et al. | |
| 10,881,551 | B2 | 1/2021 | Kraemer et al. | |
| 10,925,769 | B2 | 2/2021 | Kraemer | |
| 11,197,781 | B2 | 12/2021 | Wittnebel | |
| 2003/0007769 | A1 * | 1/2003 | Anderson | G02B 6/3616 385/136 |
| 2003/0052960 | A1 * | 3/2003 | Okazaki | B41J 2/45 347/238 |
| 2008/0231830 | A1 * | 9/2008 | Osada | G01S 7/497 356/4.07 |
| 2009/0213330 | A1 | 8/2009 | Silverstein et al. | |
| 2014/0276676 | A1 | 9/2014 | Schuele et al. | |
| 2018/0360657 | A1 | 12/2018 | Bor et al. | |
| 2019/0201238 | A1 | 7/2019 | Bacher et al. | |
| 2021/0135424 | A1 | 5/2021 | Bacher et al. | |
| 2021/0137739 | A1 | 5/2021 | Kraemer | |
| 2022/0354575 | A1 | 11/2022 | Jung et al. | |
| 2023/0113339 | A1 | 4/2023 | Ovchinnikov | |
| 2023/0116921 | A1 | 4/2023 | Jung et al. | |

FOREIGN PATENT DOCUMENTS

| | | | |
|---|---|---|---|
| EP | 0346116 | A2 | 12/1989 |
| JP | 2003052844 | A | 2/2003 |
| JP | 2003180848 | A | 7/2003 |
| KR | 20130109664 | A | 10/2013 |
| RU | 2349998 | C2 | 3/2009 |
| WO | 2009108543 | A2 | 9/2009 |

OTHER PUBLICATIONS

Peter Gregorčič, Matija Jezeršek, and Janez Možina, Optodynamic energy-conversion efficiency during an Er:YAG-laser-pulse delivery into a liquid through different fiber-tip geometries, Journal of Biomedical Optics 17(7), 075006 (Jul. 2012)).

Wikipedia. "Optical Chopper." Retrieved from https://en.wikipedia.org/w/index.php?title=Optical_chopper&oldid=943497792 on May 12, 2020.

* cited by examiner

LASER PULSE SELECTION AND ENERGY LEVEL CONTROL

CROSS-REFERENCE TO RELATED APPLICATIONS

This application claims the benefit of priority of U.S. Provisional Patent Application Ser. No. 63/222,521 titled "LASER PULSE SELECTION AND ENERGY LEVEL CONTROL," filed on Jul. 16, 2021, which is hereby incorporated by reference in its entirety as though fully and completely set forth herein.

TECHNICAL FIELD

The present disclosure is directed to systems and methods for selectively passing or blocking laser pulses and for laser energy control.

BACKGROUND

Lasers are used in many different medical procedures including a number of different ophthalmic procedures. For example, lasers may be used in cataract surgery, such as for fragmenting the cataractous lens. In some procedures, a laser is used for initial fragmentation of the lens, followed by phacoemulsification of the lens by an ultrasonic handpiece to complete the break down of the lens for removal. In other procedures, the laser may be used for complete fragmentation or phacoemulsification of the lens for removal, without the need for a separate application of ultrasonic energy. Lasers may also be used for other steps in cataract surgery, such as for making the corneal incision(s) and/or opening the capsule.

Lasers may also be used in vitreoretinal surgery. In some procedures, a laser may be used for vitrectomy, to sever or break the vitreous fibers for removal. The laser may be incorporated into a vitrectomy probe, and the energy from the laser may be applied to the vitreous fibers to sever or break the vitreous fibers for removal.

In other vitreoretinal applications, lasers may be used for photocoagulation of retinal tissue. Laser photocoagulation may be used to treat issues such as retinal tears and/or the effects of diabetic retinopathy.

U.S. Patent Application Publication No. 2018/0360657 discloses examples of an ophthalmic laser system. That application describes laser uses such as for forming surgical cuts or for photodisrupting ophthalmic tissue as well as for cataract surgery, such as laser-assisted cataract surgery (LACS). U.S. Patent Application Publication No. 2019/0201238 discloses other examples of an ophthalmic laser system. That application describes laser uses such as in a vitrectomy probe for severing or breaking vitreous fibers. U.S. Patent Application Publication No. 2018/0360657 and U.S. Patent Application Publication No. 2019/0201238 are expressly incorporated by reference herein in their entirety.

Some laser systems emit pulses, with the pulses having a desired duration and repetition rate. Operating a laser in pulses can achieve desirable power and energy characteristics for a particular application. In addition, while the energy of a beam emitted by a laser can be controlled by controlling the laser itself, in some systems it is desirable to control the amount of energy of a laser beam downstream from the laser. Existing systems for laser pulse selection and energy control typically have one or more drawbacks, such as power loss, complexity, cost, etc. There is a need for improved systems and methods for laser pulse selection and energy level control.

SUMMARY

The present disclosure is directed to improved systems and methods for selectively passing or blocking laser electromagnetic energy.

In some embodiments, a laser system comprises a laser configured to emit electromagnetic radiation and a laser shutter assembly, wherein the laser shutter assembly comprises a shutter, the shutter having an axis of rotation and at least one open area and at least one solid area arranged around the axis of rotation of the shutter, a shutter rotation motor configured to rotate the shutter around the axis of rotation of the shutter. The shutter may be arranged such that, when rotated around the axis of rotation of the shutter, an open area of the shutter and a solid area of the shutter are alternately positioned in a path of the electromagnetic radiation emitted by the laser.

In some embodiments, the laser may be configured to emit electromagnetic radiation in pulses. The laser shutter assembly may be configured to operate in different modes, including an allow-all-pulses mode in which all laser pulses are allowed to pass through in whole or in part, a block-all-pulses mode in which the shutter blocks all laser pulses from passing through, and at least one intermittently-block-pulses mode in which some laser pulses are allowed to pass through in whole or in part and some laser pulses are blocked by the shutter.

In some embodiments, the laser shutter assembly further comprises a shutter rotation sensor, wherein the laser system is configured to operate the shutter rotation motor in response to signals from the shutter rotation sensor to control the rotation of the shutter with respect to the timing of the laser pulses.

In some embodiments, the laser shutter assembly further comprises a carriage position motor operatively connected to the shutter and configured to move the shutter into different positions corresponding to the different operating modes of the laser shutter assembly. In some embodiments, the shutter comprises a plurality of tracks corresponding to its different positions, including a first track in which a first percentage of the laser pulses emitted by the laser are allowed to pass through and a second track in which a second percentage of the laser pulses emitted by the laser are allowed to pass through, wherein the second percentage is higher than the first percentage. In some embodiments, the laser shutter assembly further comprises a carriage cam plate and a carriage position sensor, wherein the carriage cam plate is connected to the shutter to move with the shutter, and wherein the carriage position sensor is configured to detect a position of the carriage cam plate to determine a position of the shutter.

In some embodiments, the laser system is configured to operate the shutter rotation motor to control the rotation of the shutter with respect to the timing of the laser pulses in order to operate the laser shutter assembly in its different modes.

In some embodiments, the laser system is configured to operate the shutter rotation motor to control the rotation of the shutter with respect to the laser pulses such that, for at least a set of laser pulses, a part of each of the laser pulses in the set of laser pulses is allowed to pass and a part of each of the laser pulses in the set of laser pulses is blocked, in order to control the laser energy output.

In some embodiments, a method of controlling a laser system comprises emitting electromagnetic radiation from a laser and rotating a shutter in a path of the electromagnetic radiation emitted by the laser whereby an open area of the shutter and a solid area of the shutter are alternately positioned in the path of the electromagnetic radiation emitted by the laser.

In some embodiments, the step of emitting electromagnetic radiation from the laser comprises emitting electromagnetic radiation from the laser in pulses, and the method further comprises operating the shutter in different modes, including an allow-all-pulses mode in which all laser pulses are allowed to pass through in whole or in part, a block-all-pulses mode in which the shutter blocks all laser pulses from passing through, and at least one intermittently-block-pulses mode in which some laser pulses are allowed to pass through in whole or in part and some laser pulses are blocked by the shutter.

In some embodiments, the method further comprises operating the shutter in response to signals from a shutter rotation sensor to control the rotation of the shutter with respect to the timing of the laser pulses.

In some embodiments, the method further comprises moving the shutter into different positions corresponding to the different operating modes using a carriage position motor operatively connected to the shutter. In some embodiments, the step of moving the shutter into different positions comprises moving the shutter into a first position in which a first percentage of the laser pulses emitted by the laser are allowed to pass through and into a second position in which a second percentage of the laser pulses emitted by the laser are allowed to pass through, wherein the second percentage is higher than the first percentage. In some embodiments, the method further comprises determining a position of the shutter by detecting a position of a carriage cam plate using a carriage position sensor, wherein the carriage cam plate is connected to the shutter to move with the shutter.

In some embodiments, the method further comprises controlling the rotation of the shutter with respect to the timing of the laser pulses in order to operate the shutter in its different modes.

In some embodiments, the method further comprises controlling the rotation of the shutter with respect to the laser pulses such that, for at least a set of laser pulses, a part of each of the laser pulses in the set of laser pulses is allowed to pass and a part of each of the laser pulses in the set of laser pulses is blocked, in order to control the laser energy output.

In some embodiments, a laser system comprises a laser configured to emit electromagnetic radiation and an energy control assembly, wherein the energy control assembly comprises a waveplate, a rotatable carriage, wherein the waveplate is connected to the rotatable carriage and is configured to rotate with the rotatable carriage, and a waveplate position motor operatively connected to the rotatable carriage and configured to move the rotatable carriage to rotate the waveplate into different positions corresponding to different operating modes of the waveplate. In some embodiments, the laser is configured to emit electromagnetic radiation in pulses, and the different operating modes of the waveplate include an allow-all-radiation mode in which all of the laser electromagnetic radiation is allowed to pass through, a block-all-radiation mode in which all of the laser electromagnetic radiation is blocked from passing through, and at least one allow-partial-radiation mode in which some of the laser electromagnetic radiation is allowed to pass through and some of the laser electromagnetic radiation is blocked.

In some embodiments, a method of controlling a laser system comprises emitting electromagnetic radiation from a laser and rotating a waveplate in a path of the electromagnetic radiation emitted by the laser into different positions corresponding to different operating modes of the waveplate. In some embodiments, the different operating modes of the waveplate include an allow-all-radiation mode in which all of the laser electromagnetic radiation is allowed to pass through, a block-all-radiation mode in which all of the laser electromagnetic radiation is blocked from passing through, and at least one allow-partial-radiation mode in which some of the laser electromagnetic radiation is allowed to pass through and some of the laser electromagnetic radiation is blocked.

Further examples and features of embodiments of the invention will be evident from the drawings and detailed description.

BRIEF DESCRIPTION OF THE DRAWINGS

The accompanying drawings illustrate example implementations of the devices and methods disclosed herein and, together with the description, serve to explain the principles of the present disclosure.

Figure 1:
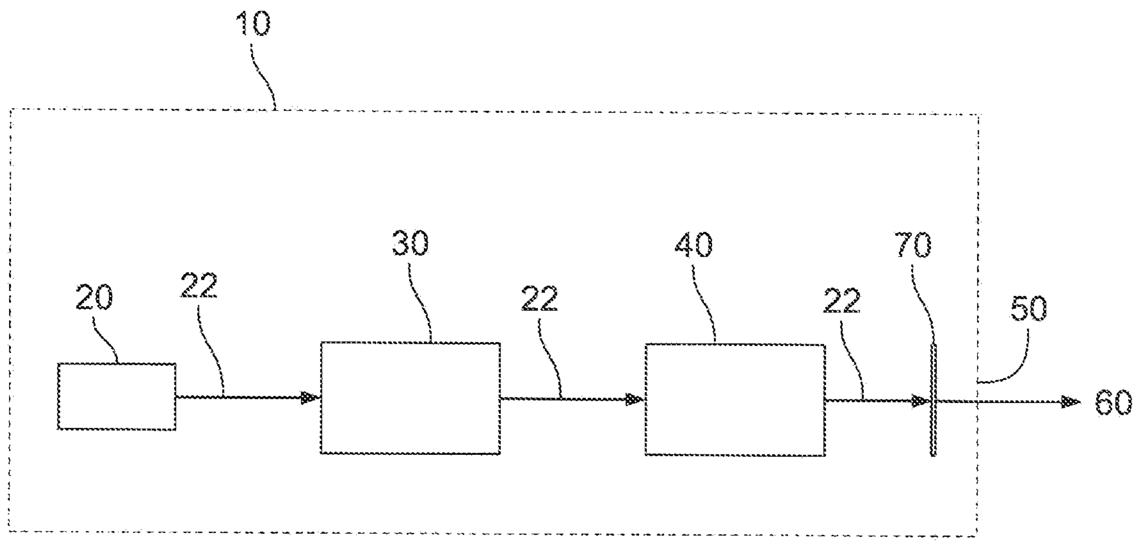
FIG. 1 shows a schematic view of an example of a laser system in accordance with the disclosure.
Figure 2:
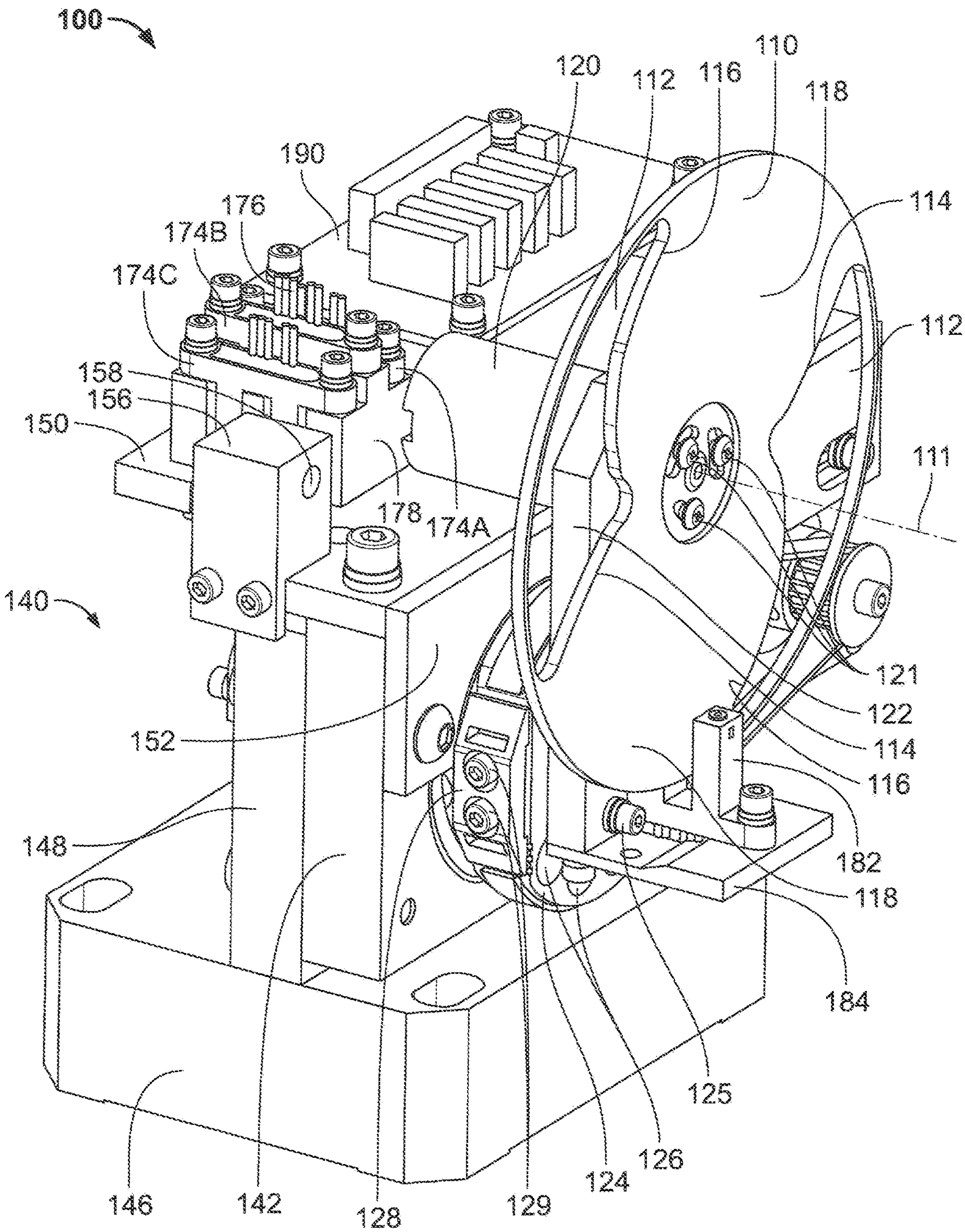
FIG. 2 shows a first perspective view of an example laser shutter assembly in accordance with the disclosure.
Figure 3:
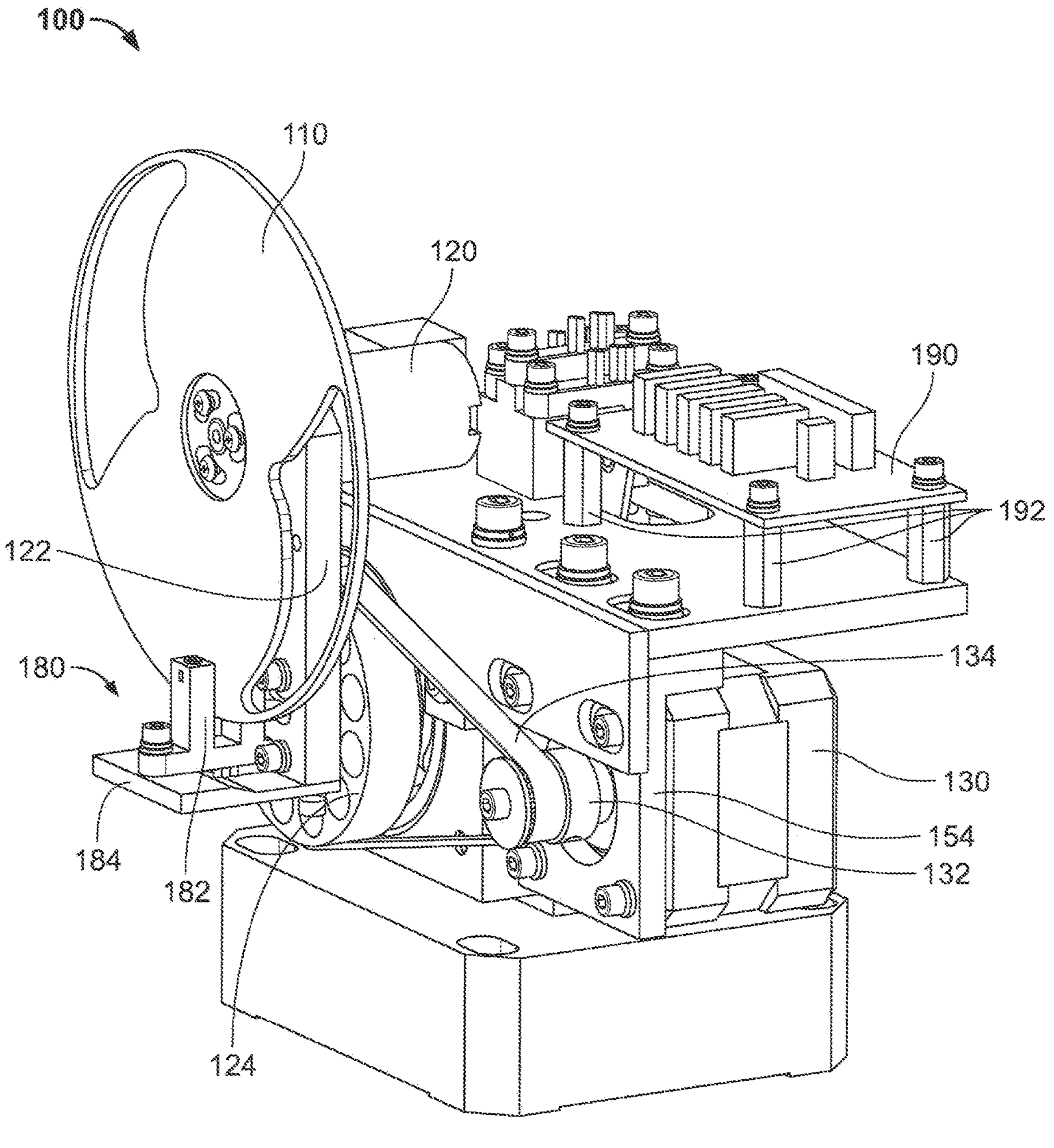
FIG. 3 shows a second perspective view of the laser shutter assembly of FIG. 2.
Figure 4:
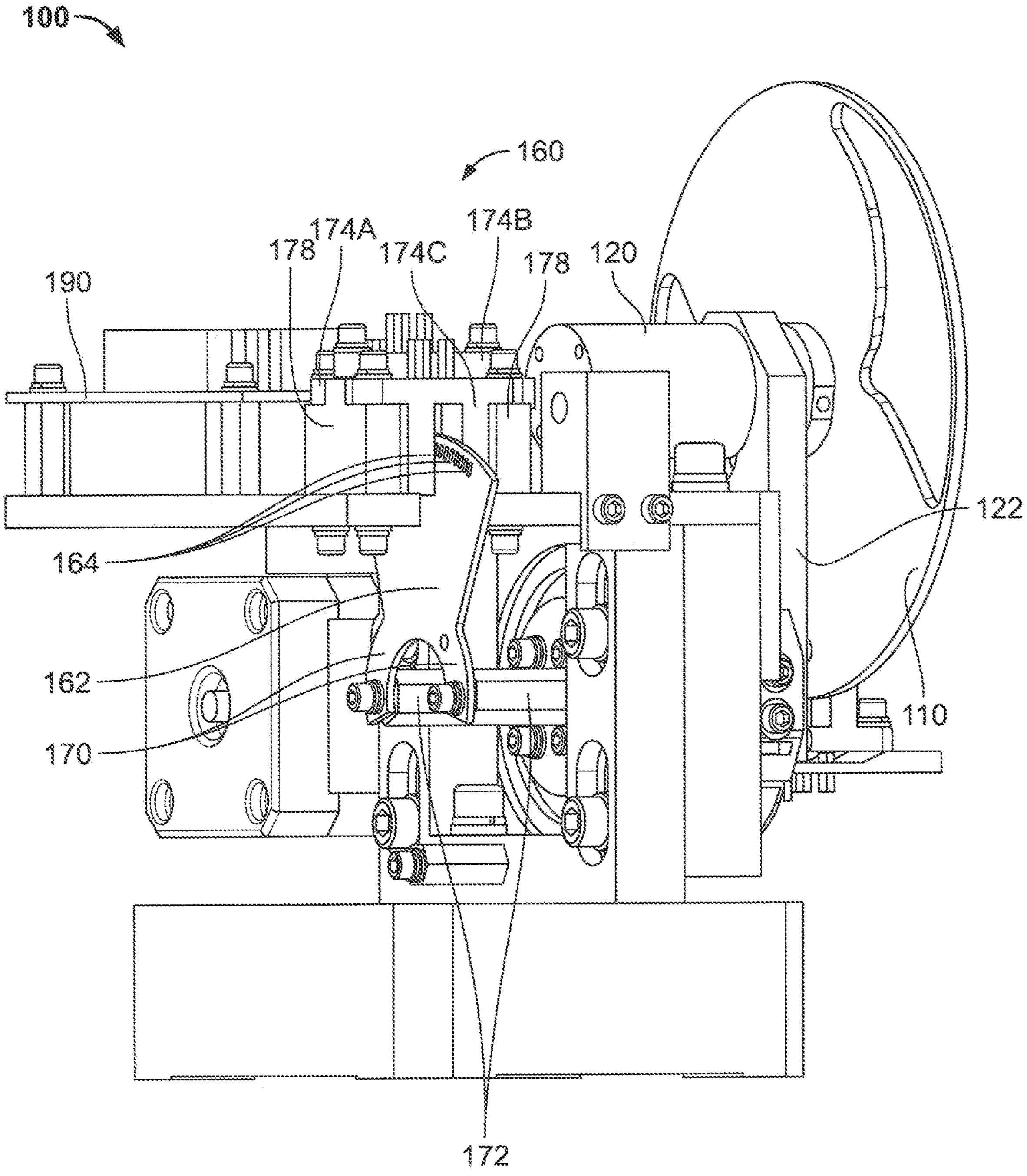
FIG. 4 shows a third view of the laser shutter assembly of FIG. 2.
Figure 5:
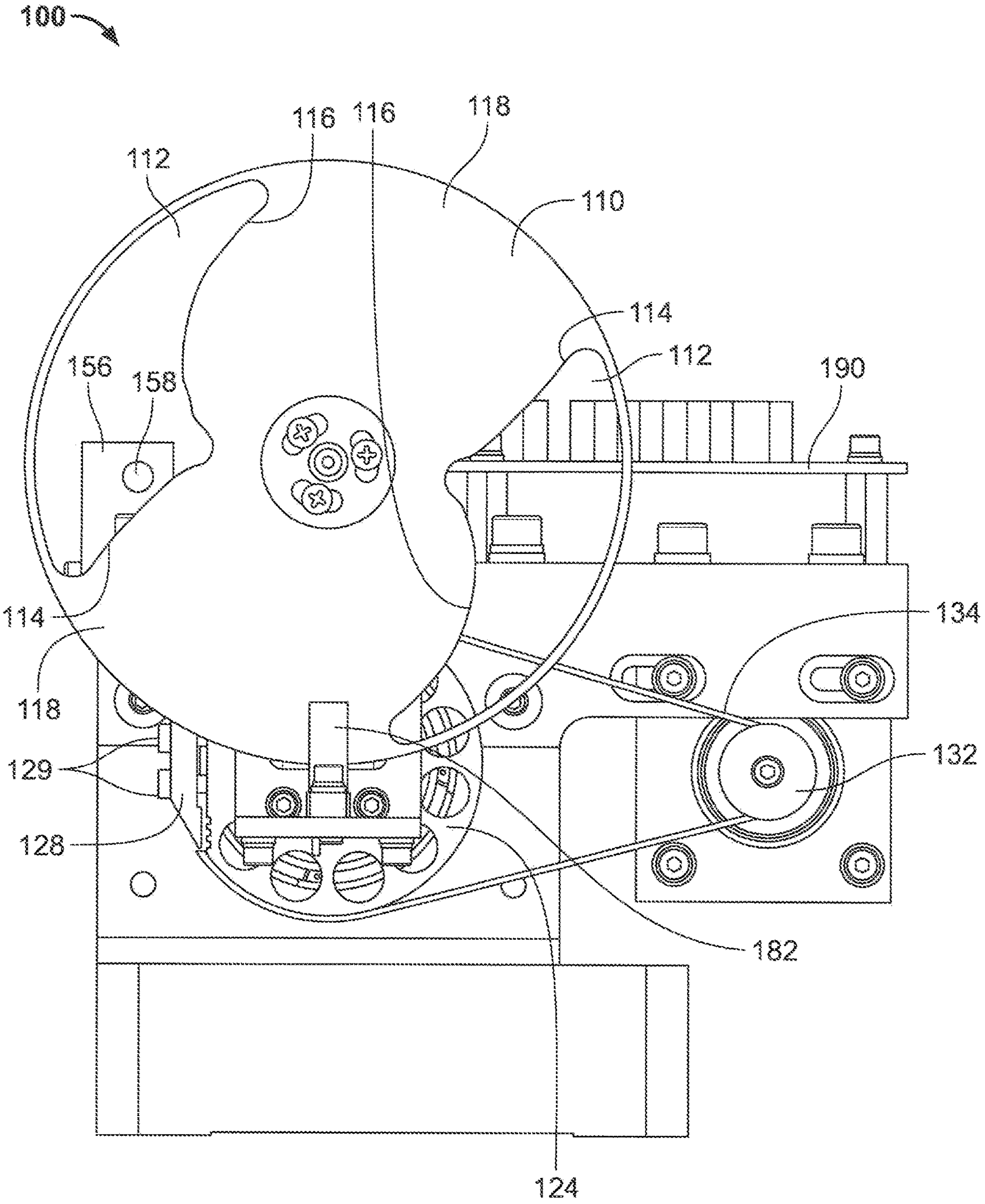
FIG. 5 shows a front view of the laser shutter assembly of FIG. 2.
Figure 6:
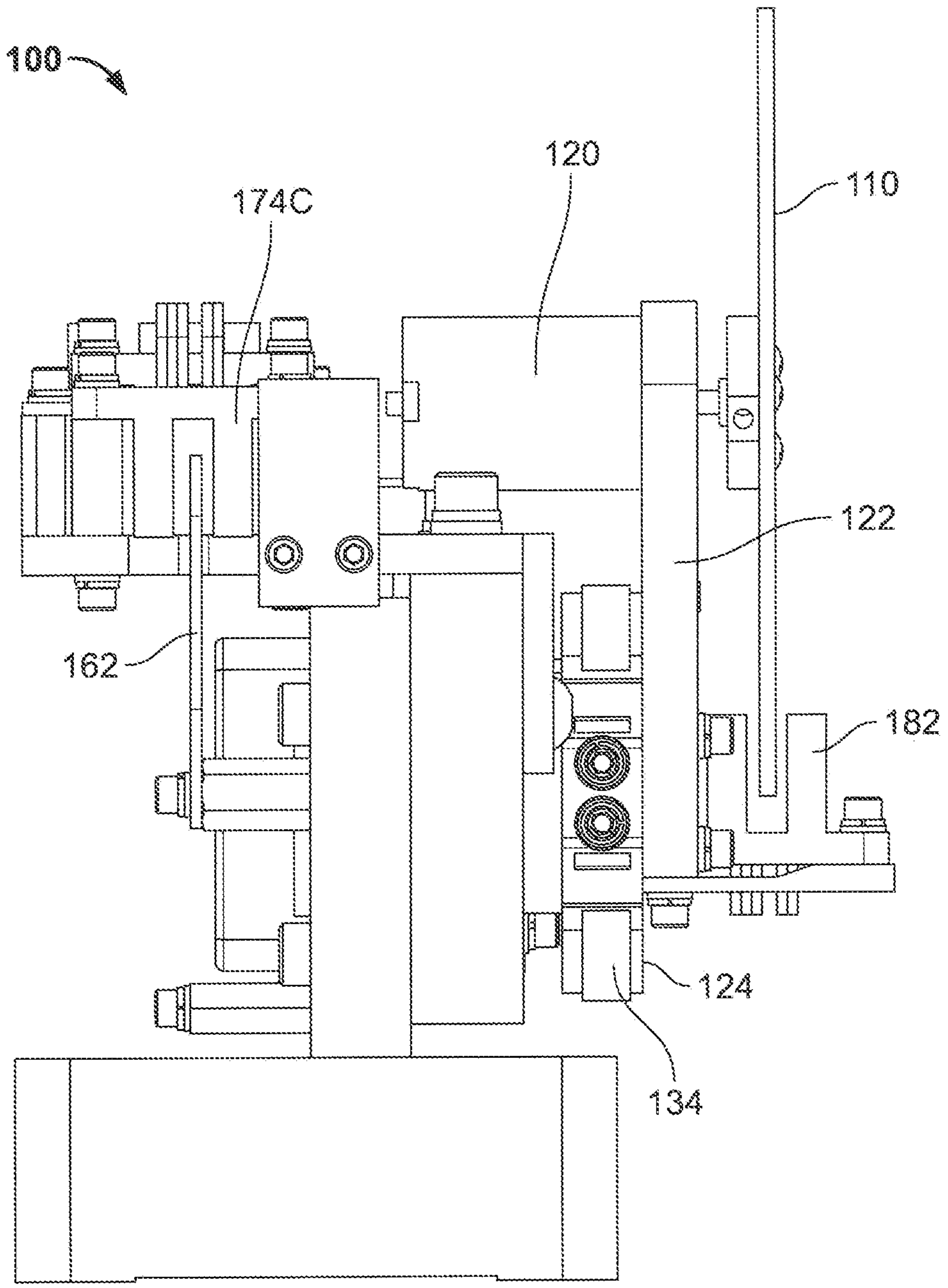
FIG. 6 shows a left side view of the laser shutter assembly of FIG. 2.
Figure 7:
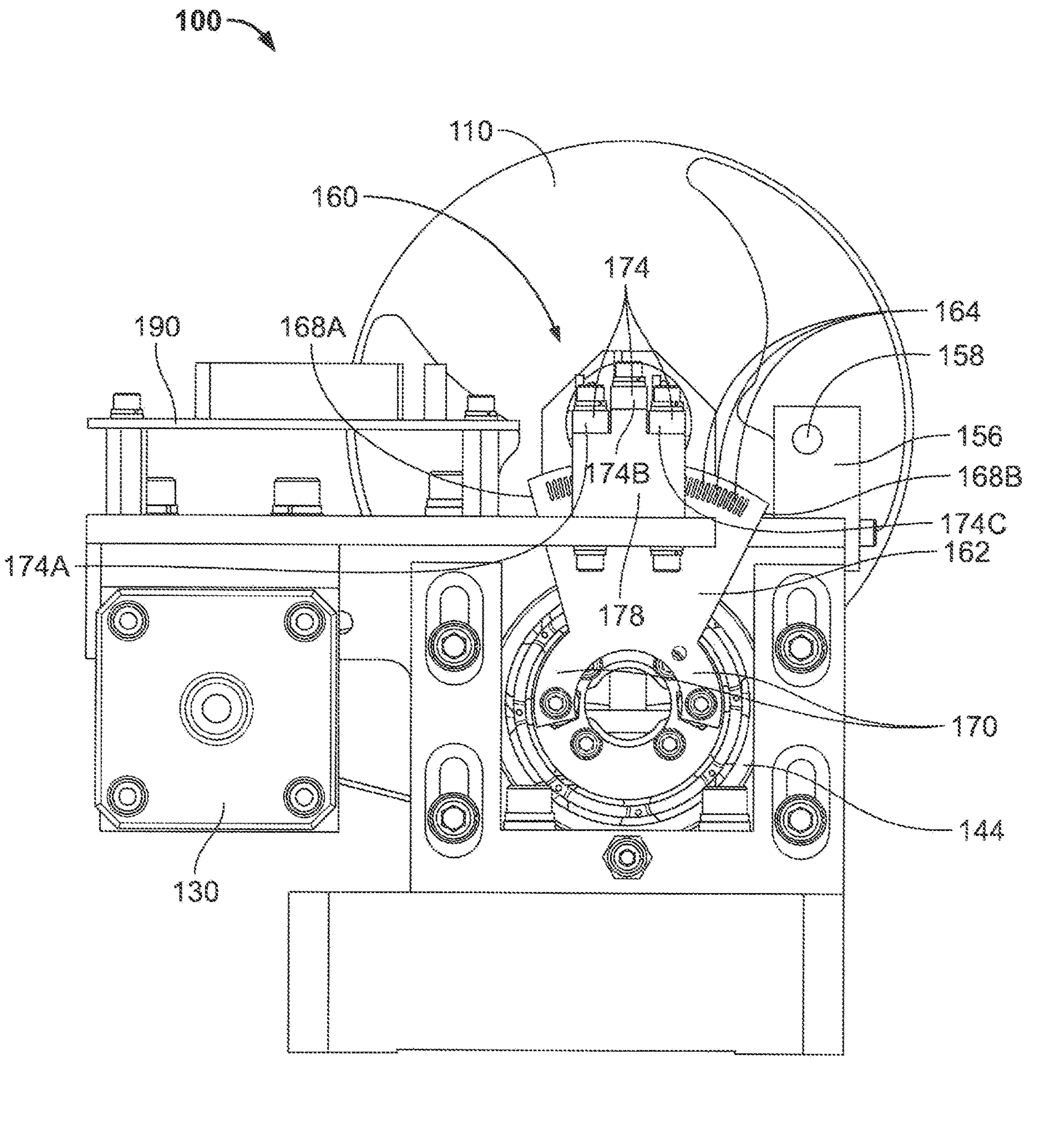
FIG. 7 shows a rear view of the laser shutter assembly of FIG. 2.
Figure 8:
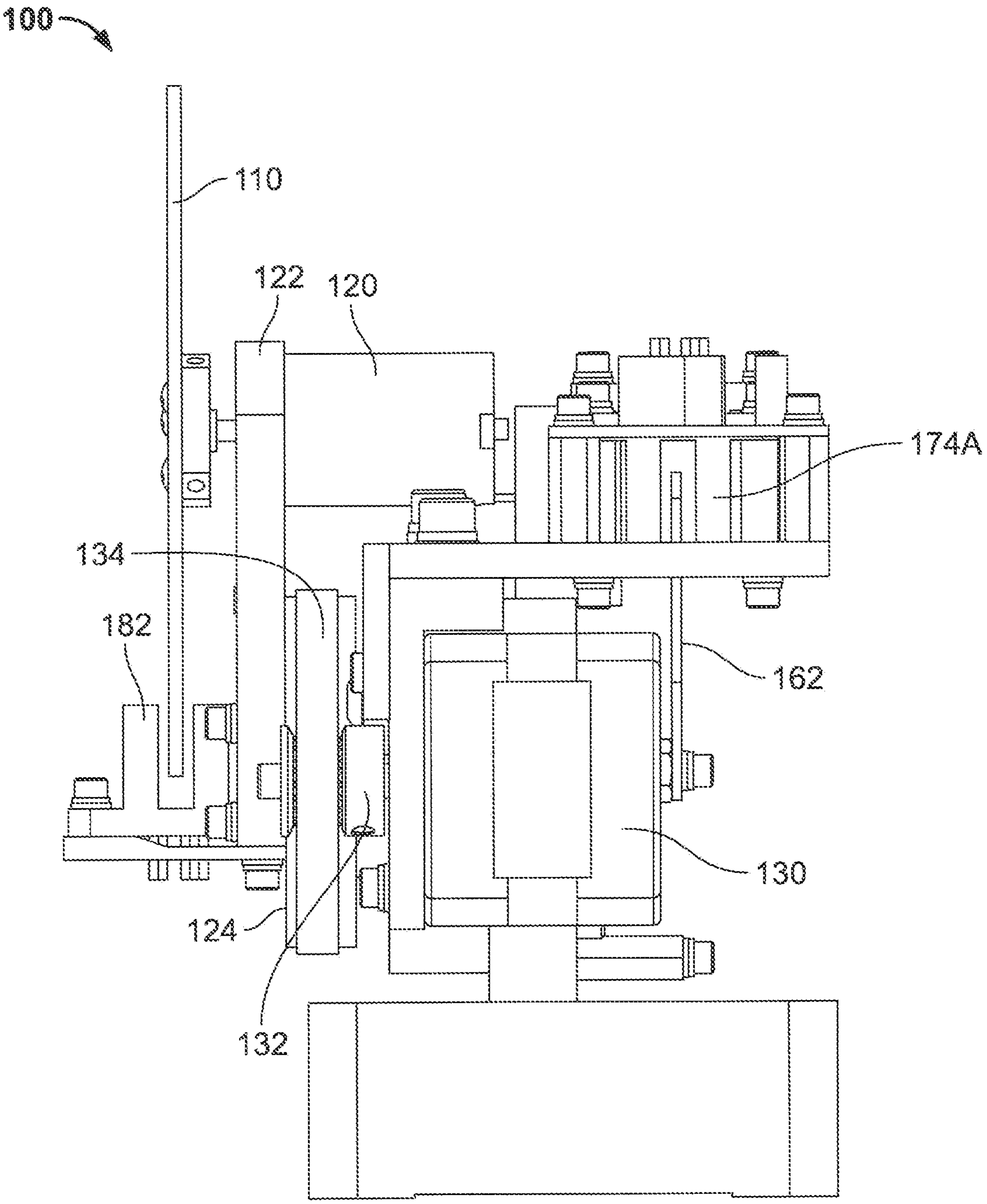
FIG. 8 shows a right side view of the laser shutter assembly of FIG. 2.

The accompanying drawings may be better understood by reference to the following detailed description.

DETAILED DESCRIPTION

For the purposes of promoting an understanding of the principles of the disclosure, reference will now be made to the implementations illustrated in the drawings, and specific language will be used to describe those implementations and other implementations. It will nevertheless be understood that no limitation of the scope of the claims is intended by the examples shown in the drawings or described herein. Any alterations and further modifications to the illustrated or described systems, devices, instruments, or methods, and any further application of the principles of the present disclosure, are fully contemplated as would normally occur to one skilled in the art to which the disclosure relates. In particular, the features, components, and/or steps described with respect to one implementation of the disclosure may be combined with features, components, and/or steps described with respect to other implementations of the disclosure. For simplicity, in some instances the same reference numbers are used throughout the drawings to refer to the same or like parts.

The designations "first" and "second" as used herein are not meant to indicate or imply any particular positioning or other characteristic. Rather, when the designations "first" and "second" are used herein, they are used only to distinguish one component from another. The terms "attached," "connected," "coupled," and the like mean attachment, connection, coupling, etc., of one part to another either directly or indirectly through one or more other parts, unless direct or indirect attachment, connection, coupling, etc., is specified.

In accordance with embodiments of the disclosure, a laser system as described herein comprises a laser and may include a laser pulse selection system, a laser energy control system, or both a laser pulse selection system and a laser energy control system.

FIG. 1 is a schematic illustration of an example laser system 10. The example laser system 10 comprises a laser 20, a laser pulse selection system 30, a laser energy control system 40, and a polarizer plate 70, although either the laser pulse selection system or the laser energy control system as well as the polarizer plate may be omitted. If desired and depending upon the application, the laser system 10 may also comprise one or more other optical components or other components. In operation, the laser 20 emits laser electromagnetic radiation along a laser path 22 through the system, whereby it exits an output 50 of the system and is directed to a target 60. In example embodiments, the target may be ophthalmic tissue, such as a cataractous lens, vitreous fibers, retinal tissue, or other tissue.

FIGS. 2 through 8 show various views of an example laser shutter assembly 100 that may be used in a laser system such as the laser system 10 in FIG. 1. The laser shutter assembly 100 may function as a laser pulse selection system like the laser pulse selection system 30 in FIG. 1.

As shown in FIGS. 2 through 8, the example laser shutter assembly 100 comprises a rotatable shutter 110. As described in more detail below, the shutter 110 is used for selectively blocking laser electromagnetic radiation or allowing laser electromagnetic radiation to pass. The shutter 110 has one or more open areas 112 and one or more solid areas 118. Each open area 112 has a leading edge 114 and a trailing edge 116.

The shutter 110 is rotatable about an axis of rotation 111. The shutter 110 is rotatable with respect to a laser path, such that the open areas 112 and solid areas 118 are alternately positioned in the laser path. When an open area 112 is positioned in the laser path, the open area allows the laser electromagnetic radiation directed toward the open area 112 to pass through the open area 112. In the illustrated embodiment, the open areas 112 are open holes or gaps through the shutter 110. When a solid area 118 is positioned in the laser path, the solid area 118 blocks the laser electromagnetic radiation directed toward the solid area 118 from passing through the solid area 118. In the context of this disclosure, blocking the laser electromagnetic radiation means preventing all or substantially all of the laser electromagnetic radiation from passing through. The solid areas 118 may comprise opaque or substantially opaque material. In the illustrated embodiment, the shutter 110 comprises a metallic or opaque or substantially opaque plastic. In the illustrated example, the solid areas 118 are sections of the shutter 110 and are of the same material.

In the illustrated example, the open areas 112 are completely bounded by structure of the shutter 110. In other embodiments, the open areas 112 may be unbounded on one or more sides or sections. For example, the open areas 112 may be notches, cutouts, openings or other suitable configurations. In one example, the shutter has a shape similar to a fan, with alternating open areas and solid areas that have wedge shapes, triangular shapes, fan blade shapes, or other suitable shapes.

In the illustrated example, the shutter 110 is in the form of a wheel or disk. However, the shutter 110 may take any other suitable form. For example, the shutter may be a plate with a non-circular perimeter, or have a fan structure as described above, or be shaped like a block or barrel with openings such that it has alternating open areas and solid areas.

The laser shutter assembly 100 further comprises a shutter rotation motor 120 for rotating the shutter 110. The shutter rotation motor 120 may be, for example, a brushless DC motor, or any other suitable motor for rotating the shutter 110. The shutter 110 is coupled to the rotor of the shutter rotation motor 120 for rotation by the shutter rotation motor 120. The shutter 110 may be coupled directly to the rotor of the shutter rotation motor 120 or through one or more other components. Fasteners 121 may be used for coupling the shutter 110 to the shutter rotation motor 120, either directly or indirectly.

In addition to being rotatable with respect to a laser path, the shutter 110 also may be moved into different positions with respect to the laser path to change the characteristics of how much the shutter 110 blocks the laser electromagnetic radiation during each revolution of the shutter 110. The shutter 110 and the shutter rotation motor 120 are attached to a moveable arm 122 such that the shutter 110 and the shutter rotation motor 120 move with the moveable arm 122 when the moveable arm 122 moves. The moveable arm 122 in turn is attached to a moveable carriage 124, for example by fasteners 125.

In the illustrated example, the carriage 124 is generally disk-shaped, although other suitable shapes and configurations may be used. The carriage 124 may have holes or openings 126 in it, which serve to reduce the amount of material of the component, reducing its weight and cost. The carriage 124 is configured for rotation about an axis. In operation, the rotation range of the carriage 124 is within an amount that causes the moveable arm 122 to move in a desired arc, as described in further detail below.

Movement of the carriage 124, which causes movement of the moveable arm 122 and consequently the shutter 110 along an arc, is performed by a carriage position motor 130. In the illustrated example, the carriage position motor 130 is a stepper motor, although other suitable motors such as voice-coil and other motors may be used. The carriage position motor 130 drives a pulley 132. A belt 134 extends around the pulley 132 and the carriage 124. The ends of the belt 134 are coupled to the carriage 124 by a clamp 128, which may be secured to the carriage 124, for example by fasteners 129. The ends of the belt 134 may be secured to the carriage 124 in other ways, for example directly by fasteners or adhesives or through one or more other parts. In other embodiments, the belt 134 may be a continuous belt extending fully around the carriage 124, engaging the carriage with a ridged surface or through a frictional engagement.

Operation of the carriage position motor 130 causes rotation of the pulley 132. The pulley 132 in turn drives the belt 134, which in turn causes rotation of the carriage 124 in the desired amount of angular movement. The desired amount of angular movement of the carriage 124 in turn causes the desired amount of movement of the shutter 110, thereby moving the shutter 110 into the desired position with respect to the laser path. In one of many possible examples, the carriage position motor 130 may be a stepper motor that generates 1.8 degrees of movement per step, or any other suitable amount.

The laser shutter assembly 100 further comprises a support structure 140 for supporting the various parts of the system. In the illustrated example, the support structure 140 comprises a support structure component 142 in the form of a bearing holder, a support structure component 146 in the form of a baseplate, a support structure component 148 in the form of a plate connected to the baseplate 146, a support structure component 150 in the form of a plate connected to the bearing holder 142, a support structure component 152 in the form of a cover plate also attached to the bearing holder 142, and a support structure component 154 in the form of a bracket attached to the plate 150 and the cover plate 152. The support structure may have more or fewer components.

The support structure 140 supports the various parts of the system 100 for their respective positionings and functions. For example, the bearing holder 142 supports the carriage 124 for rotation with respect to the bearing holder 142 through one or more bearings 144. An example bearing 144 may be a ball bearing, with the outer race secured to the bearing holder 142 and the inner race secured to the carriage 124.

The baseplate 146 supports the plate 148 which supports plate 150 which in turn supports a beam path guide 156 for aligning with the laser beam path. The beam path guide 156 has a beam path guide opening 158 through which the laser beam passes when the system 100 is mounted with respect to a laser. The beam path guide 156 may be a bracket, block, plate, or other suitable structure. The baseplate 146 serves to align the beam path guide 156 laterally, i.e., in the directions of the plane of the baseplate 146, and the plate 148 serves to align the beam path guide 156 vertically, i.e., in the direction perpendicular to the plane of the baseplate 146.

The plate 150 supports a PCB assembly 190 through support posts 192 and supports other components such as carriage position sensors 174 through support spacers 178, as described further below. The bracket 154, which is attached to the plate 150 and the plate 152, supports the carriage position motor 130.

The laser shutter assembly 100 further comprises a carriage position sensor assembly 160. The carriage position sensor assembly 160 serves to help ensure that the shutter 110 is in the desired position. The carriage position sensor assembly 160 comprises a carriage cam plate 162 in the form of a plate or other suitable structure. The illustrated example carriage cam plate 162 has one or more rotation sensor window opening(s) 164, a first detection edge 168A, and a second detection edge 168B. The carriage cam plate 162 is coupled to the shutter 110, e.g., by being directly attached to the carriage 124, the moveable arm 122, or another component that moves with the shutter 110. In the illustrated example, the carriage cam plate 162 has arms 170 that are attached to support posts 172 that are in turn attached to the carriage 124 and consequently to the moveable arm 122 and shutter 110.

The carriage position sensor assembly 160 further comprises one or more sensors 174. In the illustrated example, the sensors 174 are slotted optical sensors, and three such sensors, carriage start position sensor 174A, carriage rotation sensor 174B, and carriage end position sensor 174C, are used in the carriage position sensor assembly 160, although more or fewer sensors 174 may be used. The ends of sensor wires 176 are shown, but it will be understood by persons having ordinary skill in the art that the sensor wires connect the sensors 174 for communication with suitable computer components. Support spacers 178 are used for mounting the sensors 174 in the desired positions.

The laser shutter assembly 100 further comprises a shutter rotation sensor assembly 180. The shutter rotation sensor assembly 180 serves to help ensure that the shutter 110 is rotating about its rotational axis at the desired timing. The shutter rotation sensor assembly 180 comprises one or more shutter rotation sensor(s) 182. In the illustrated example, the shutter rotation sensor 182 is a slotted optical sensor, and one such shutter rotation sensor 182 is used, although more shutter rotation sensors 182 may be used. A support structure component 184 in the form of a bracket supports the shutter rotation sensor 182. The bracket 184 may be attached to the moveable arm 122 and/or to the carriage 124 or another component such that the shutter rotation sensor 182 is in a fixed position with respect to the rotational axis of the shutter 110.

The laser shutter assembly 100 may include computer and electrical components as known in the art for controlling the system 100. The computer components may include one or more processors, memory components, and hardware and/or software components. Some components such as integrated circuits may be supported on the PCB assembly 190, which is mounted on plate 150 through support posts 192.

In operation, the laser shutter assembly 100 is mounted as part of a laser system including a laser, such as the laser 20 in FIG. 1. The laser shutter assembly 100 is mounted with respect to the laser such that when the laser is in operation the laser beam will be selectively blocked or allowed to pass depending on the position of the shutter 110. In the illustrated example, the laser shutter assembly 100 is mounted with respect to the laser such that when the laser is in operation the laser beam passes through the beam path guide opening 158 of the beam path guide 156. The laser shutter assembly 100 may be mounted with respect to the laser such that when the laser is in operation the laser beam passes through the shutter 110 before passing through the beam path guide opening 158 of the beam path guide 156. Alternatively, the laser shutter assembly 100 may be mounted with respect to the laser such that when the laser is in operation the laser beam passes through the beam path guide opening 158 of the beam path guide 156 before passing through the shutter 110.

Laser electromagnetic radiation that is allowed to pass through the laser shutter assembly 100 will continue toward the output of the laser system. Such laser electromagnetic radiation may continue to one or more other components of the laser system, such as a laser energy control system and/or one or more other components.

The laser of the laser system may be operated to emit electromagnetic energy in pulses, such that the shutter 110 serves to selectively block or allow to pass certain laser pulses from the laser. Alternatively, the laser may be operated to emit electromagnetic energy continuously, such that the shutter 110 serves to selectively block the laser beam or allow the laser beam to pass, thereby creating a pulsed or intermittent output from the laser shutter assembly 100.

Figure 9:
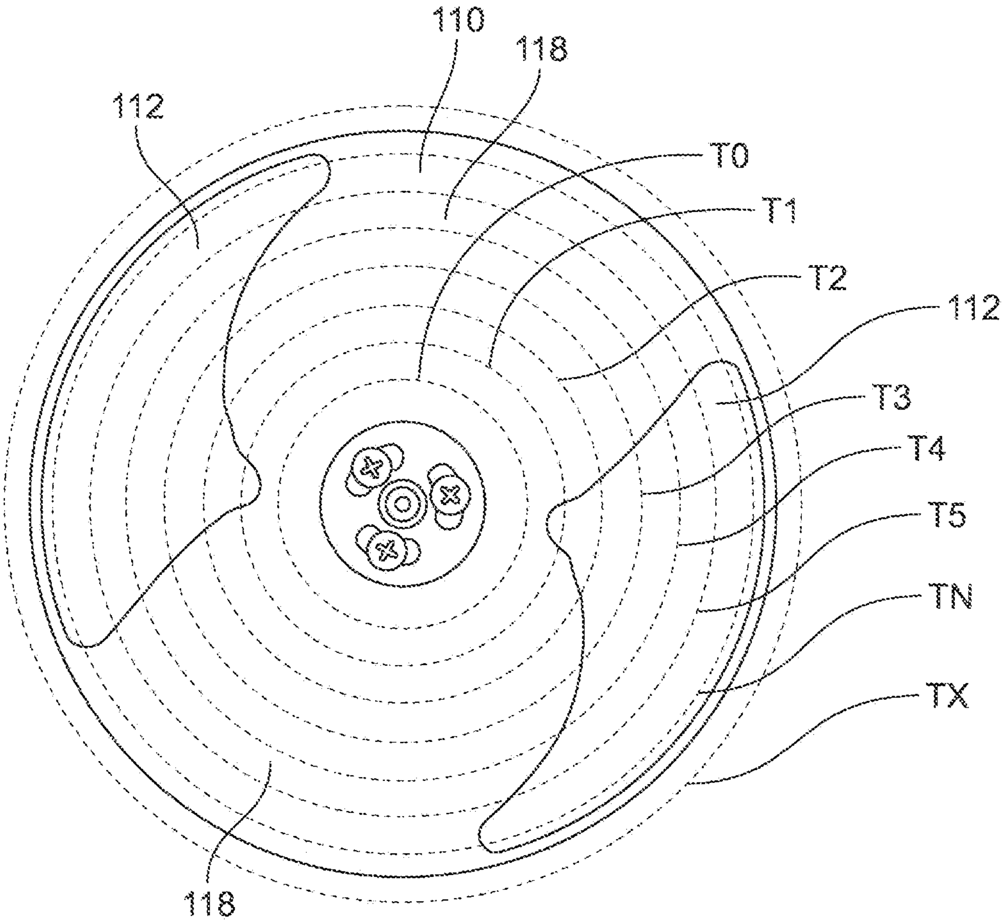
FIG. 9 shows a front view of the shutter of the laser shutter assembly of FIG. 2.
Figure 10:
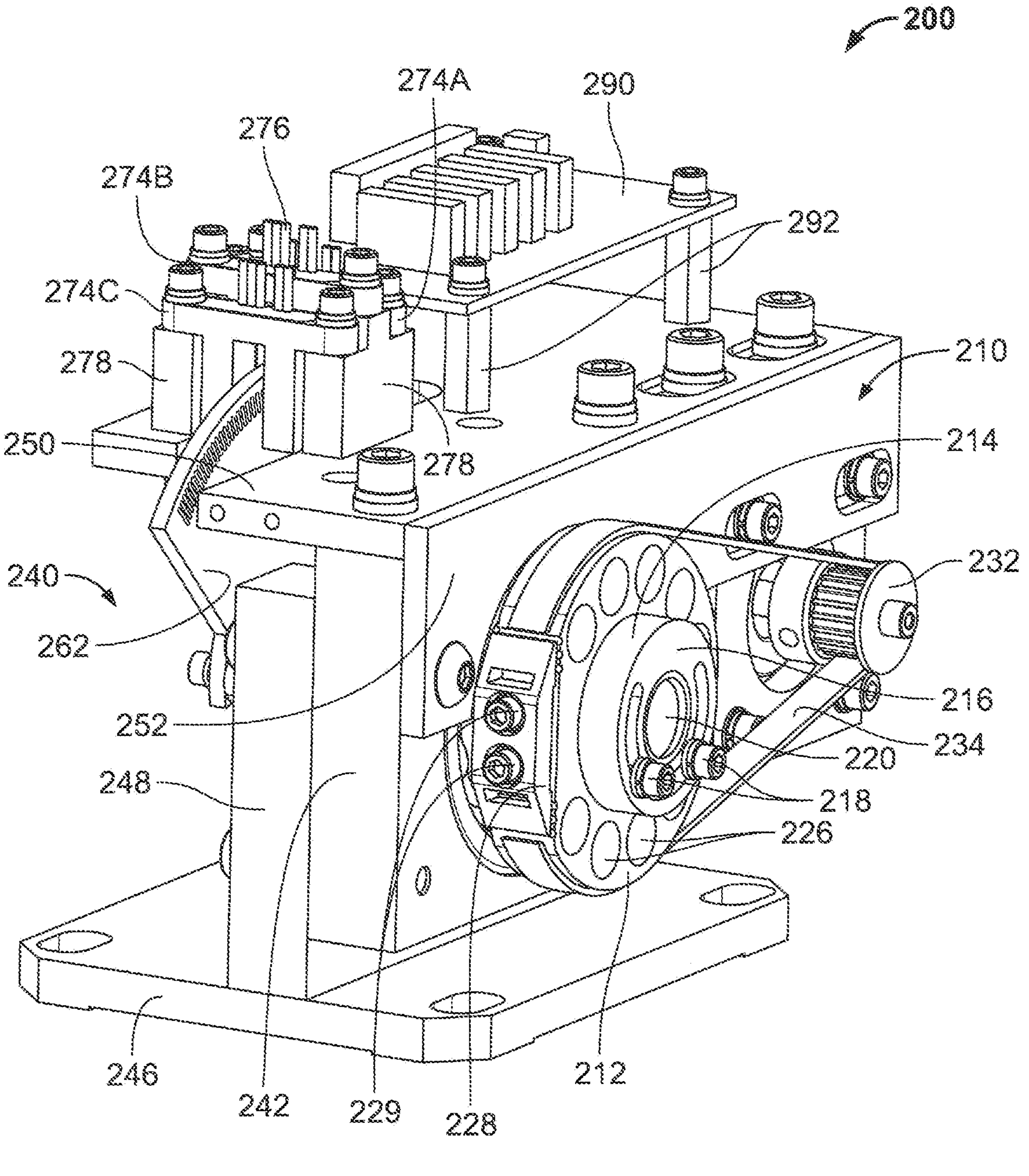
FIG. 10 shows a first perspective view of an example laser energy control assembly in accordance with the disclosure.
Figure 11:
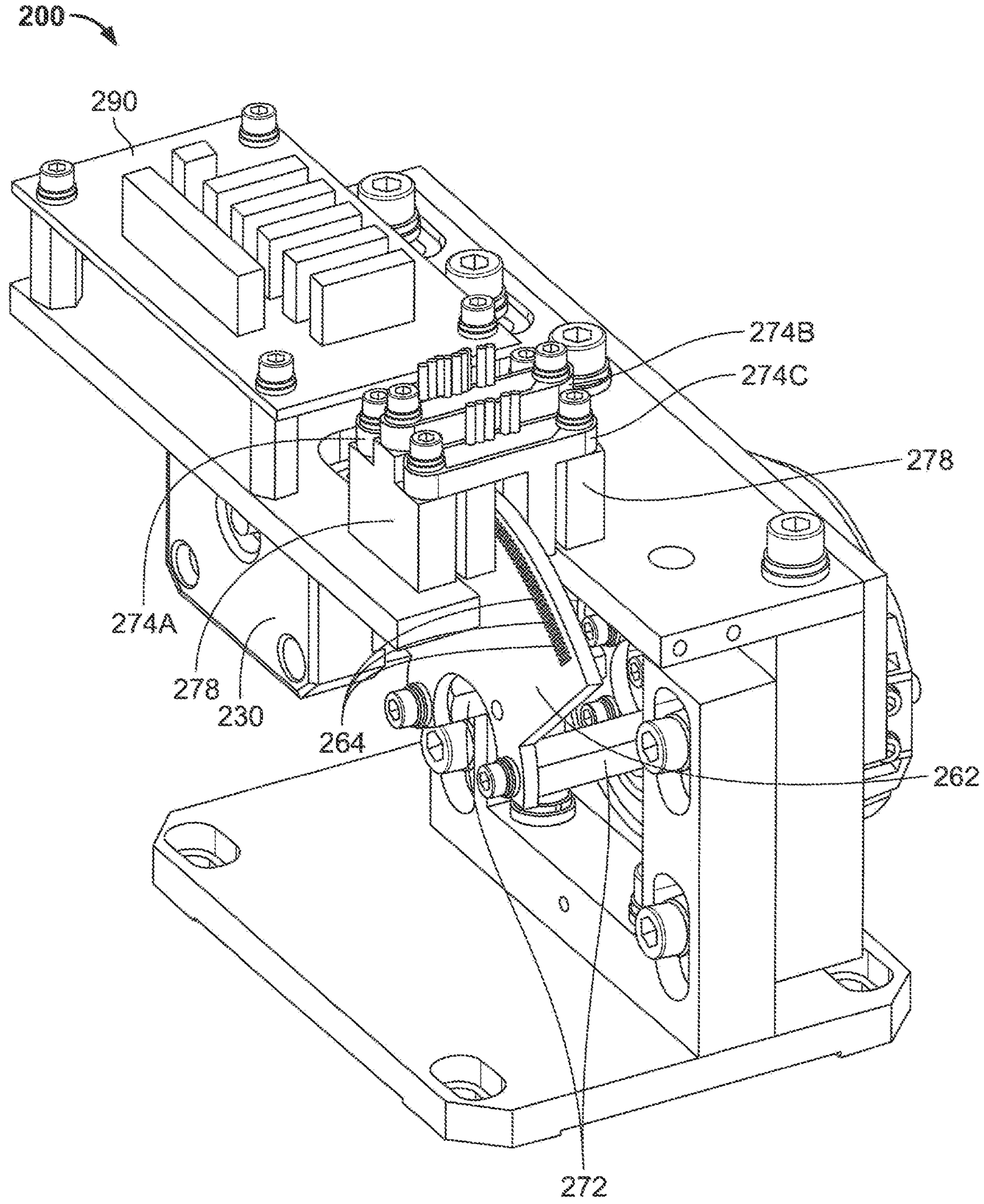
FIG. 11 shows a second perspective view of the laser energy control assembly of FIG. 10.
Figure 12:
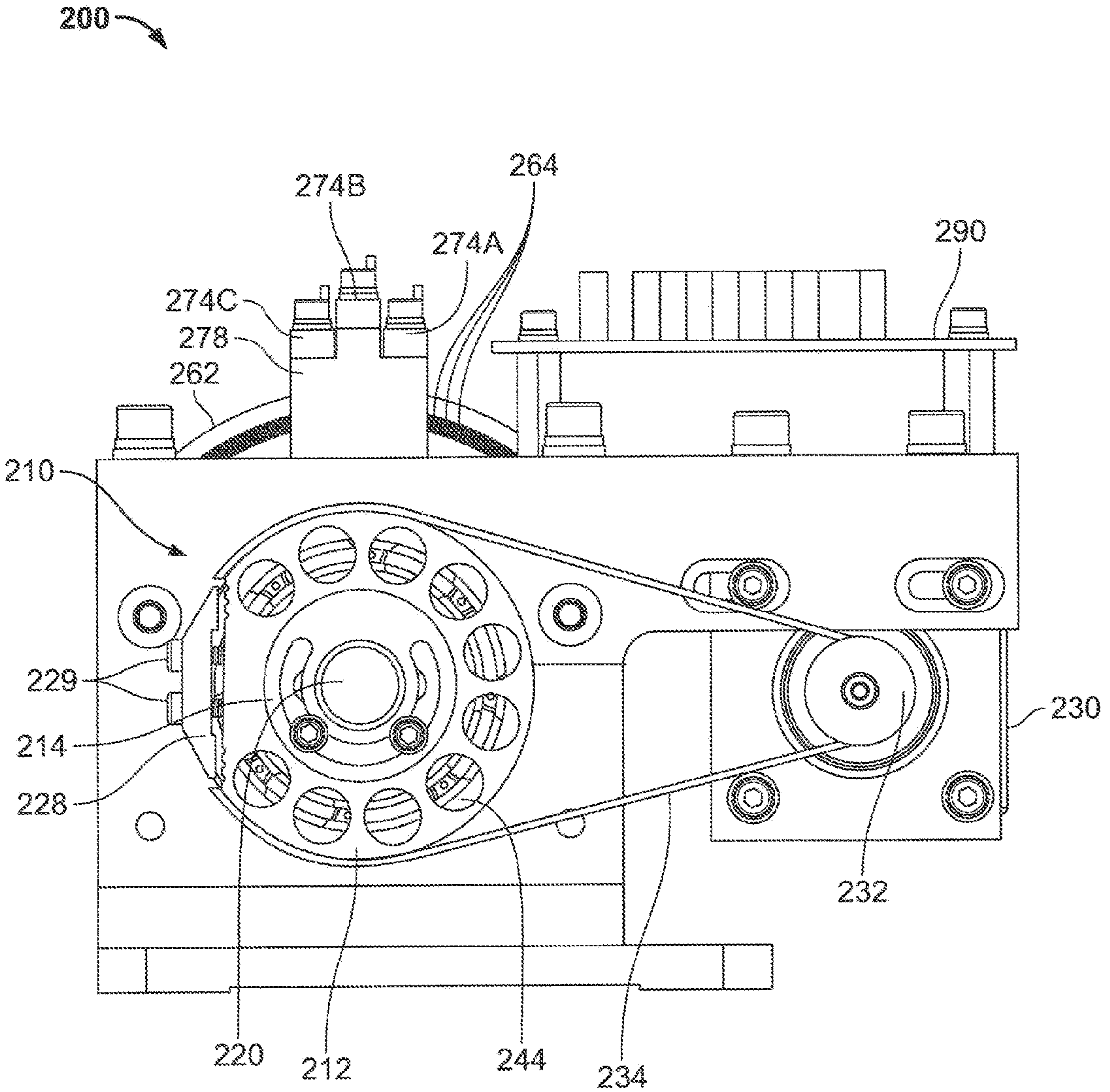
FIG. 12 shows a front view of the laser energy control assembly of FIG. 10.
Figure 13:
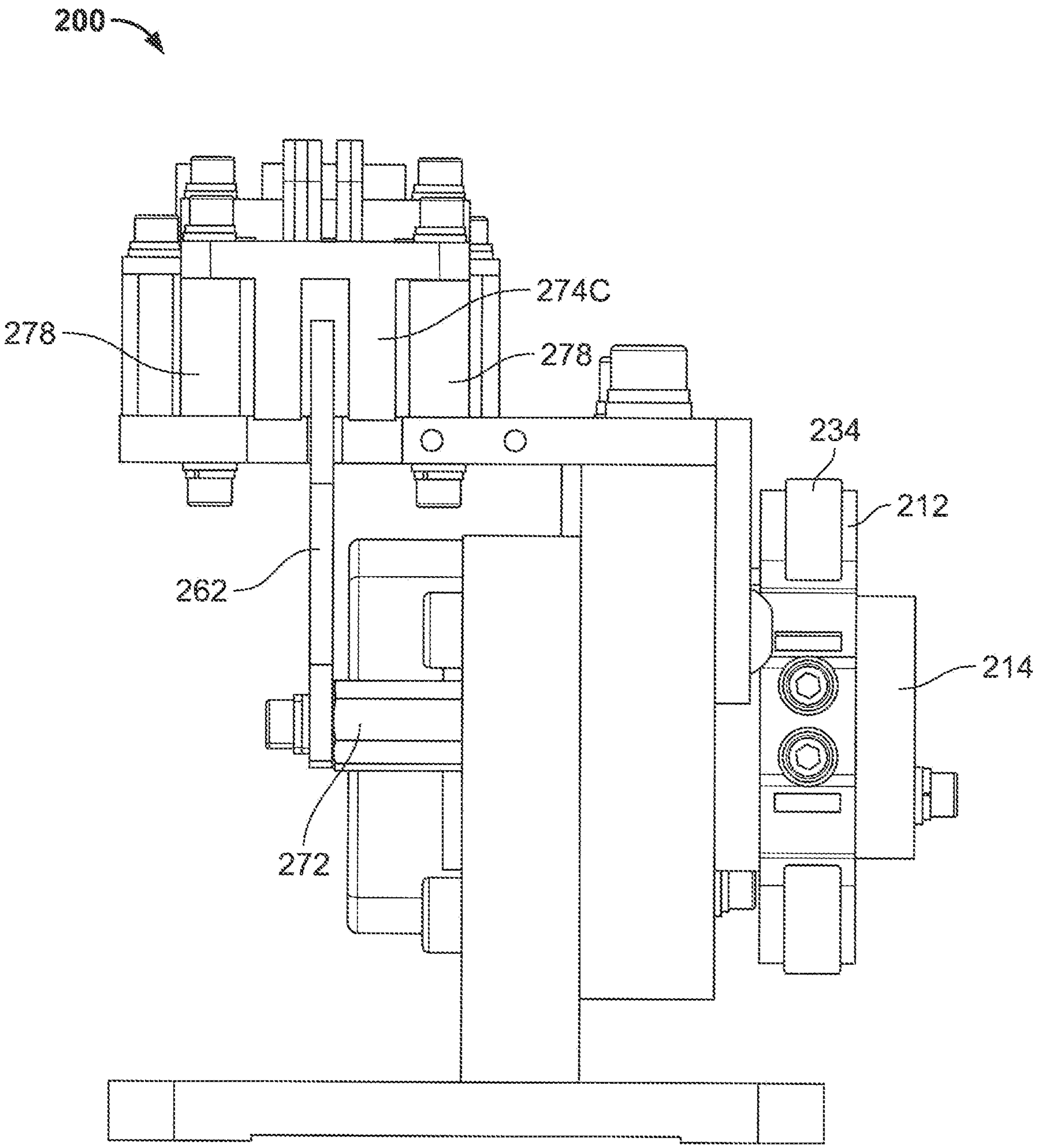
FIG. 13 shows a left side view of the laser energy control assembly of FIG. 10.
Figure 14:
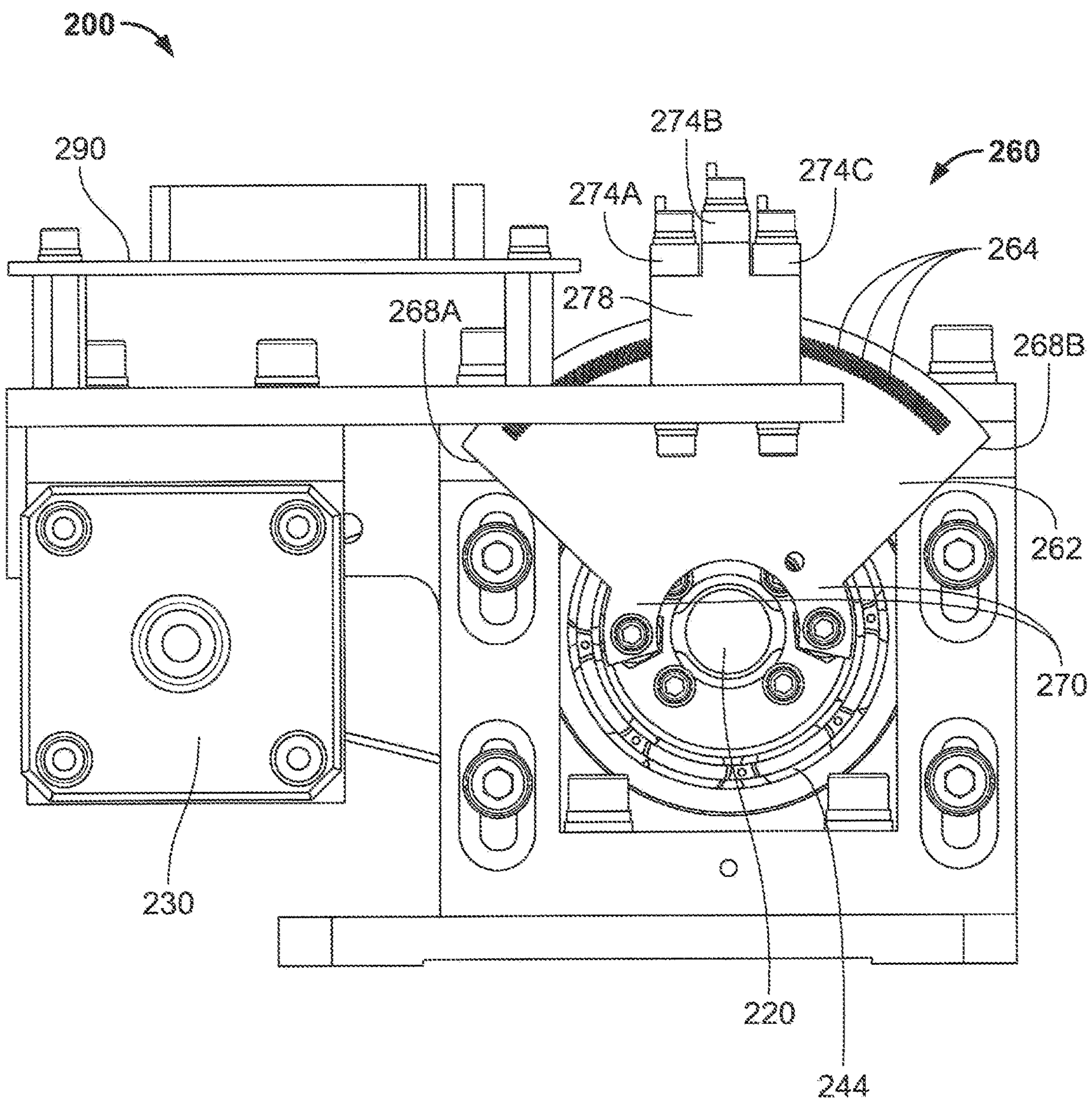
FIG. 14 shows a rear view of the laser energy control assembly of FIG. 10.
Figure 15:
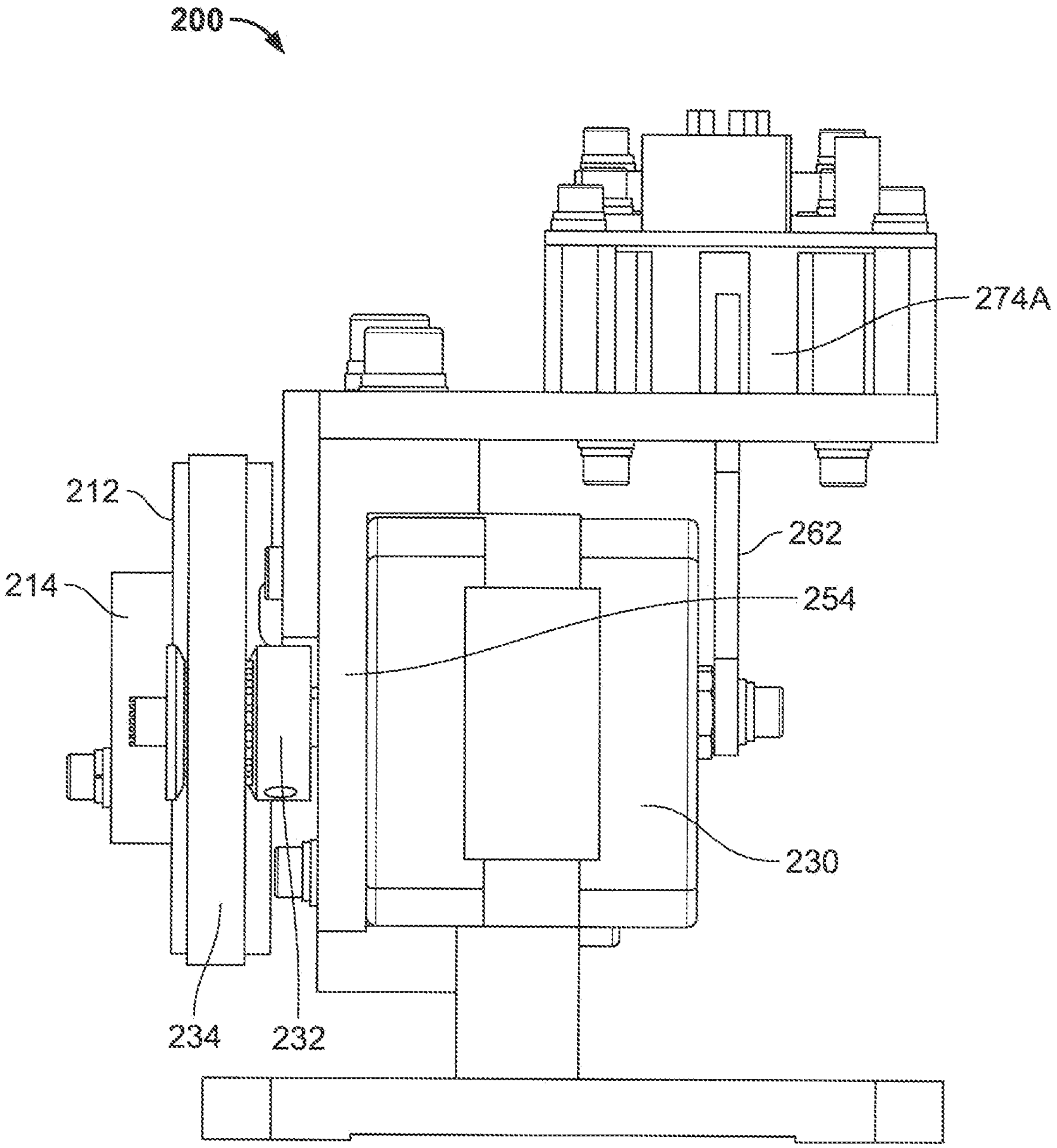
FIG. 15 shows a right side view of the laser energy control assembly of FIG. 10.

Depending on input selecting the mode of operation, which may be through user control or through automatic control, the carriage position motor 130 causes rotation of the carriage 124 in the desired amount of angular movement to move the shutter 110 into one of its operating positions. FIG. 9 illustrates tracks, indicated by dashed circular paths labeled T0, T1, T2, T3, T4, T5, TN, and TX, that correspond to example operating positions of the shutter 110. In the example of FIG. 9, the shutter 110 has eight operating positions, corresponding to eight tracks. More or fewer operating positions and corresponding tracks may be used.

The dashed circular paths or tracks labeled T0, T1, T2, T3, T4, T5, TN, and TX indicate where the laser path would be when the shutter 110 is in the corresponding position. The operating positions are as follows: operating position 0=block-all mode, operating position X=allow-all mode, and operating positions 1 through N=intermittently-block modes, where N is the number of such positions. In the example of FIG. 9, there are six intermittently-block operating positions, i.e., N=6.

Circular path or track T0 indicates a position in which the shutter 110 blocks the laser path during the entire revolution of the shutter 110. In this position, a solid area 118 is in the laser path during the entire revolution of the shutter 110. Circular path or track TX indicates a position in which the shutter 110 does not block the laser path at all during the entire revolution of the shutter 110. In this position, the entire shutter 110 is out of the way of the laser path during the entire revolution of the shutter 110. Circular paths or tracks T1 through TN indicate positions in which the shutter 110 blocks the laser path during part of the revolution of the shutter 110. That is, in the intermittently-block modes, the shutter 110 alternately blocks the laser electromagnetic radiation and allows the laser electromagnetic radiation to pass through.

To give one of many possible examples, in one embodiment the laser may emit pulses at a frequency of 900 pulses per second. The shutter 110 may be operated to rotate at 2700 revolutions per minute, which is 45 revolutions per second. With these specifications, the laser will emit 20 pulses in each revolution of the shutter 110. With the geometry of the open area(s) 112 and solid area(s) 118, an example shutter 110 operative with these parameters can allow pulses to pass through as follows: operating position 1 corresponding to track T1 allows one pulse out of every ten pulses to pass through while blocking the rest, operating position 2 corresponding to track T2 allows two consecutive pulses out of every ten pulses to pass through while blocking the rest, operating position 3 corresponding to track T3 allows three consecutive pulses out of every ten pulses to pass through while blocking the rest, operating position 4 corresponding to track T4 allows four consecutive pulses out of every ten pulses to pass through while blocking the rest, operating position 5 corresponding to track T5 allows five consecutive pulses out of every ten pulses to pass through while blocking the rest, and operating position 6 corresponding to track T6 (in an embodiment in which N=6) allows six consecutive pulses out of every ten pulses to pass through while blocking the rest. Stated another way, operating positions 1, 2, 3, 4, 5, and 6 allow 10%, 20%, 30%, 40%, 50%, and 60%, respectively, of the laser pulses to pass through while blocking the rest.

Many other variations are possible. The laser may emit pulses at any frequency suitable for a particular application and may switch frequencies in operation. The shutter 110 may be operated to rotate at any suitable speed and may switch speeds in operation. The laser may emit any suitable number of pulses in each revolution of the shutter 110. The open area(s) 112 and solid area(s) 118 may have any suitable geometry. Any operating position may allow any suitable number of pulses to pass while also blocking any suitable number of pulses. The laser also may emit continuous electromagnetic energy, in which case the positioning of the shutter 110 may be operated to generate a pulsed output.

When the laser is operated to emit electromagnetic energy in pulses, the allow-all mode of the laser shutter assembly 100 is both an allow-all-pulses mode, allowing all laser pulses to pass through, and an allow-all-radiation mode, allowing all electromagnetic radiation to pass through. When the laser is operated to emit electromagnetic energy in pulses, the block-all mode of the laser shutter assembly 100 is both a block-all-pulses mode, blocking all laser pulses from passing through, and a block-all-radiation mode, blocking all electromagnetic radiation from passing through. When the laser is operated to emit electromagnetic energy in pulses, the intermittently-block mode of the laser shutter assembly 100 is both an intermittently-block-pulses mode, rapidly switching between allowing one or more consecutive laser pulses to pass through and blocking one or more consecutive laser pulses from passing through, and an allow-partial-radiation mode, allowing only a selected part of the electromagnetic radiation to pass through.

When the laser is operated to emit electromagnetic energy continuously, the allow-all mode of the laser shutter assembly 100 is an allow-all-radiation mode, allowing all electromagnetic radiation to pass through. When the laser is operated to emit electromagnetic energy continuously, the block-all mode of the laser shutter assembly 100 is a block-all-radiation mode, blocking all electromagnetic radiation from passing through. When the laser is operated to emit electromagnetic energy continuously, the intermittently-block mode of the laser shutter assembly 100 is both a pulse-creating-mode, generating a pulsed or intermittent output, and an allow-partial-radiation mode, allowing only a selected part of the electromagnetic radiation to pass through.

The carriage position sensor assembly 160 serves to help ensure that the shutter 110 is in the desired operating position. The carriage position sensors 174 are optical sensors, having a light source such as an LED on one side of the carriage cam plate 162 and a photodetector on the opposite side of the carriage cam plate 162. When one of the rotation sensor window openings 164 is positioned between the light source and photodetector of a carriage position sensor 174, the light is able to pass through the opening 164 and is detected by the photodetector. Alternatively, when the solid, opaque material of the carriage cam plate 162 is positioned between the light source and photodetector of a carriage position sensor 174, the light is blocked and not detected by the photodetector.

In an example, the system may calibrate the position of the shutter 110 by operating the carriage position motor 130 to move the shutter 110 and consequently the carriage cam plate 162 until the carriage start position sensor 174A detects the first detection edge 168A. This may be done, for example, by moving the carriage position motor 130 in steps until the light path of the carriage start position sensor 174A is blocked by the carriage cam plate 162. Alternatively, if the initial position is one in which the light path of the carriage start position sensor 174A is blocked by the carriage cam plate 162, this may be done, for example, by moving the carriage position motor 130 in steps until the light path of the carriage start position sensor 174A is no longer blocked by the carriage cam plate 162. In another example, the system may calibrate the position of the shutter 110 by operating the carriage position motor 130 to move the shutter 110 and consequently the carriage cam plate 162 until the carriage end position sensor 174C detects the second detection edge 168B. This may be done, for example, by moving the carriage position motor 130 in steps until the light path of the carriage end position sensor 174C is blocked by the carriage cam plate 162. Alternatively, if the initial position is one in which the light path of the carriage end position sensor 174C is blocked by the carriage cam plate 162, this may be done, for example, by moving the carriage position motor 130 in steps until the light path of the carriage end position sensor 174C is no longer blocked by the carriage cam plate 162. As carriage position motor 130 is activated to move in steps, the light path interruptions through rotation sensor window openings 164 cause the carriage rotation sensor 174B to toggle its output state as a confirmation feedback to the PCB assembly 190.

Once the position is determined by one or more of the carriage position sensors 174, e.g., by detection of one of the detection edges 168, that position may be used as a starting position from which the operating positions may be determined. For example, the system 100 may be configured such that each of the operating positions is a certain number of carriage position motor steps from the starting position. The system is programmed with the number of steps corresponding to each of the operating positions. Thus, to move to a desired operating position, the carriage position motor moves from whatever current position it is in to the desired new position by moving the known number of steps in the known direction from the current position to the new position.

The laser shutter assembly 100 may use the shutter rotation sensor assembly 180 to help ensure that the shutter 110 is rotating at the desired timing. This may include helping ensure that the shutter 110 is rotating at the desired rotational speed and/or helping ensure that the shutter 110 is phase-locked with the frequency of a pulsed laser.

Like the carriage position sensors 174, the shutter rotation sensor 182 is an optical sensor, with a light source such as an LED on one side of the shutter 110 and a photodetector on the opposite side of the shutter 110. When an open area 112 of the shutter 110 is positioned between the light source and photodetector of the shutter rotation sensor 182, the light is able to pass through the open area 112 and is detected by the photodetector. Alternatively, when a solid area 118 of the shutter 110 is positioned between the light source and photodetector of the shutter rotation sensor 182, the light is blocked and not detected by the photodetector.

In an example, the system may calibrate the rotational timing of the shutter 110 by operating the shutter rotation motor 120 to rotate the shutter 110 and by using the shutter rotation sensor 182 to detect its rotation. The shutter rotation sensor 182 may be used to detect a leading edge 114 and/or a trailing edge 116 of an open area 112. The detection may be used to detect the rotational speed of the shutter 110 and to adjust the shutter rotation motor 120 to adjust the rotational speed of the shutter 110. Additionally or alternatively, the detection may be used to adjust the shutter rotation motor 120 to adjust the rotation of the shutter 110 so that it is phase-locked with a pulsed laser, so that the desired number of pulses are blocked and permitted to pass.

FIGS. 10 through 15 show various views of an example laser energy control system 200 that may be used in a laser system such as the laser system 10 in FIG. 1. The laser energy control system 200 may function as an energy control system like the energy control system 40 in FIG. 1.

As shown in FIGS. 10 through 15, the example laser energy control system 200 comprises an energy control assembly 210 that may be used to control the laser energy output of the system. The energy control assembly 210 comprises a moveable carriage 212, a waveplate 220, and a mechanism for moving the carriage 212 and waveplate 220. In the illustrated example, the carriage 212 is generally disk-shaped, although other suitable shapes and configurations may be used. The carriage 212 may have holes or openings 226 in it, which serve to reduce the amount of material of the component, reducing its weight and cost. The waveplate 220 is secured to the carriage 212 for rotational movement with the carriage 212. The waveplate 220 may be attached to a waveplate holder 214 that is attached to the carriage 212 by fasteners 218. The waveplate 220 may be mounted to be flush with a front surface 216 of the waveplate holder 214. Alternatively, the waveplate 220 may be recessed from the waveplate holder 214 or mounted to the carriage 212 or some other part that moves with the carriage 212.

The carriage 212 is configured for rotation about an axis. In operation, the rotation range of the carriage 212 is within an amount that causes the waveplate 220 to rotate by a desired angular amount, as described in further detail below.

Movement of the carriage 212, which causes movement of the waveplate 220, is performed by a waveplate position motor 230. In the illustrated example, the waveplate position motor 230 is a stepper motor, although other suitable motors such as voice-coil and other motors may be used. The waveplate position motor 230 drives a pulley 232. A belt 234 extends around the pulley 232 and the carriage 212. The ends of the belt 234 are coupled to the carriage 212 by a clamp 228, which may be secured to the carriage 212, for example by fasteners 229. The ends of the belt 234 may be secured to the carriage 212 in other ways, for example directly by fasteners or adhesives or through one or more other parts. In other embodiments, the belt 234 may be a continuous belt extending fully around the carriage 212, engaging the carriage with a ridged surface or through a frictional engagement.

Operation of the waveplate position motor 230 causes rotation of the pulley 232. The pulley 232 in turn drives the belt 234, which in turn causes rotation of the carriage 212 in the desired amount of angular movement. The desired amount of angular movement of the carriage 212 causes the desired amount of angular movement of the waveplate 220. In one of many possible examples, the waveplate position motor 230 may be a stepper motor that generates 1.8 degrees of movement per step, or any other suitable amount.

The laser energy control system 200 further comprises a support structure 240 for supporting the various parts of the system. In the illustrated example, the support structure 240 comprises a support structure component 242 in the form of a bearing holder, a support structure component 246 in the form of a baseplate, a support structure component 248 in the form of a plate connected to the baseplate 246, a support structure component 250 in the form of a plate connected to the bearing holder 242, a support structure component 252 in the form of a cover plate also attached to the bearing holder 242, and a support structure component 254 in the form of a bracket attached to the plate 250 and the cover plate 252. The support structure may have more or fewer components.

The support structure 240 supports the various parts of the system 200 for their respective positionings and functions. For example, the bearing holder 242 supports the carriage 212 for rotation with respect to the bearing holder 242 through one or more bearings 244. An example bearing 244 may be a ball bearing, with the outer race secured to the bearing holder 242 and the inner race secured to the carriage 212.

The baseplate 246 supports the plate 248 which in turn supports the bearing holder 242. The bearing holder 242 supports the plate 250 and the cover plate 252. The plate 250 supports a PCB assembly 290 through support posts 292 and supports other components such as carriage position sensors 274 through support spacers 278, as described further below. The bracket 254, which is attached to the plate 250 and the cover plate 252, supports the waveplate position motor 230.

The laser energy control system 200 further comprises a carriage position sensor assembly 260. The carriage position sensor assembly 260 serves to help ensure that the waveplate 220 is in the desired position. The carriage position sensor assembly 260 comprises a carriage cam plate 262 in the form of a plate or other suitable structure. The illustrated example carriage cam plate 262 has one or more rotation sensor window opening(s) 264, a first detection edge 268A, and a second detection edge 268B. The carriage cam plate 262 is coupled to the waveplate 220, e.g., by being directly attached to the carriage 212 or another component that moves with the waveplate 220. In the illustrated example, the carriage cam plate 262 has arms 270 that are attached to support posts 272 that are in turn attached to the carriage 212 and consequently to the waveplate 220.

The carriage position sensor assembly 260 further comprises one or more carriage position sensors 274. In the illustrated example, the carriage position sensors 274 are slotted optical sensors, and three such carriage position sensors 274A, 274B, and 274C are used in the carriage position and rotation sensor assembly 260, although more or fewer carriage position sensors 274 may be used. The ends of sensor wires 276 are shown, but it will be understood by persons having ordinary skill in the art that the sensor wires connect the carriage position sensors 274 for communication with suitable computer components. Support spacers 278 are used for mounting the carriage position sensors 274 in the desired positions.

The laser energy control system 200 may include computer and electrical components as known in the art for controlling the system 200. The computer components may include one or more processors, memory components, and hardware and/or software components. Some components such as integrated circuits may be supported on the PCB assembly 290, which is mounted on plate 250 through support posts 292.

In operation, the laser energy control system 200 is mounted as part of a laser system including a laser, such as the laser 20 in FIG. 1. The laser energy control system 200 is mounted with respect to the laser such that the waveplate 220 is in the laser beam path.

The waveplate 220 works with a polarizer plate 70 to pass or block laser energy level via the rotation of the waveplate 220. The laser beam which is polarized, for example in the horizontal plane, passes through the waveplate 220, which in turn rotates the polarized laser beam anywhere from 0 to 90 degrees, based on the rotational position of the waveplate 220. After passing through the waveplate 220, the laser beam reaches the polarizer plate 70, which stops any laser beam energy that is not polarized in the same plane as the polarizer plate 70 and allows to pass all laser beam energy that is polarized in the same plane as the polarizer plate 70.

The operating positions of the waveplate 200 may be incremental positions along a 90 degree arc. All the way to one side of the arc, the waveplate 220 entirely blocks the laser electromagnetic radiation, by changing the polarity to be rotated 90 degrees with respect to the polarizer plate 70 (or, in an embodiment in which the laser electromagnetic radiation enters the waveplate 220 already rotated 90 degrees with respect to the polarizer plate 70, by leaving the polarity unchanged). All the way to the other side of the arc, the waveplate 220 allows the laser electromagnetic radiation to pass through fully, by changing the polarity to be in the same plane as the polarizer plate 70 (or, in an embodiment in which the laser electromagnetic radiation enters the waveplate 220 already in the same plane as the polarizer plate 70, by leaving the polarity unchanged). In intermediate angular positions along the 90 degree arc, the waveplate 220 allows different percentages of laser electromagnetic radiation to pass through, from 0% to 100%.

Laser electromagnetic radiation that passes through the laser energy control system 200 will continue toward the output of the laser system. Such laser electromagnetic radiation may continue to one or more other components of the laser system, such as a laser pulse selection system and/or one or more other components.

The carriage position sensor assembly 260 serves to help ensure that the waveplate 220 is in the desired operating position. The carriage position sensors 274 are optical sensors, having a light source such as an LED on one side of the carriage cam plate 262 and a photodetector on the opposite side of the carriage cam plate 262. When one of the rotation sensor window openings 264 is positioned between the light source and photodetector of a carriage position sensor 274, the light is able to pass through the opening 264 and is detected by the photodetector. Alternatively, when the solid, opaque material of the carriage cam plate 262 is positioned between the light source and photodetector of a carriage position sensor 274, the light is blocked and not detected by the photodetector.

In an example, the system may calibrate the position of the waveplate 220 by operating the waveplate position motor 230 to move the waveplate 220 and consequently the carriage cam plate 262 until the carriage start position sensor 274A detects the first detection edge 268A. This may be done, for example, by moving the waveplate position motor 230 in steps until the light path of the carriage start position sensor 274A is blocked by the carriage cam plate 262. Alternatively, if the initial position is one in which the light path of the carriage start position sensor 274A is blocked by the carriage cam plate 262, this may be done, for example, by moving the waveplate position motor 230 in steps until the light path of the carriage start position sensor 274A is no longer blocked by the carriage cam plate 262. In another example, the system may calibrate the position of the waveplate 220 by operating the waveplate position motor 230 to move the waveplate 220 and consequently the carriage cam plate 262 until the carriage end position sensor 274C detects the second detection edge 268B. This may be done, for example, by moving the waveplate position motor 230 in steps until the light path of the carriage end position sensor 274C is blocked by the carriage cam plate 262. Alternatively, if the initial position is one in which the light path of the carriage end position sensor 274C is blocked by the carriage cam plate 262, this may be done, for example, by moving the waveplate position motor 230 in steps until the light path of the carriage end position sensor 274C is no longer blocked by the carriage cam plate 262. As waveplate position motor 230 is activated to move in steps, the light path interruptions through rotation sensor window openings 264 cause the carriage rotation sensor 274B to toggle its output state as a confirmation feedback to the PCB assembly 290.

Once the position is determined by one or more of the carriage position sensors 274, e.g., by detection of one of the detection edges 268, that position may be used as a starting position from which the operating positions may be determined. For example, the system 200 may be configured such that one of the detection edges 268 corresponds to one end of a 90 degree operating arc of the waveplate 220, and the other of the detection edges 268 corresponds to the other end of the 90 degree operating arc of the waveplate 220. Alternatively, the system 200 may be configured such that one of the detection edges 268 is a known distance away from one end of a 90 degree operating arc of the waveplate 220, and the other of the detection edges 268 is a known distance away from the other end of the 90 degree operating arc of the waveplate 220.

Thus, at one end of the 90 degree operating arc of the waveplate 220, which may correspond to the position of one of the detection edges 268 or to a known distance away from the position of one of the detection edges 268, the waveplate 220 entirely blocks the laser electromagnetic radiation. At the other end of the 90 degree operating arc of the waveplate 220, which may correspond to the position of the other of the detection edges 268 or to a known distance away from the position of the other of the detection edges 268, the waveplate 220 allows the laser electromagnetic radiation to pass through fully. In intermediate angular positions along the 90 degree arc, the waveplate 220 allows different percentages of laser electromagnetic radiation to pass through, between 0% and 100%. The steps of the waveplate position motor 230 along the arc correspond to different positions and different amounts of energy control and can be used to adjust the amount of laser energy allowed to pass. The system may be programmed with the number of steps corresponding to each of the operating positions along the arc. Thus, to move to a desired operating position, the waveplate position motor 230 moves from whatever current position it is in to the desired new position by moving the known number of steps in the known direction from the current position to the new position.

Stated another way, when the waveplate 220 is in a first position along its operating arc, the laser energy control system 200 and the waveplate 220 are in the allow-all mode, which is an allow-all-radiation mode, allowing all electromagnetic radiation to pass through. When the waveplate 220 is in a second position along its operating arc, the laser energy control system 200 and the waveplate 220 are in the block-all mode, which is a block-all-radiation mode, blocking all electromagnetic radiation from passing through. When the waveplate 220 is between the first position and the second position along its operating arc, the laser energy control system 200 and the waveplate 220 are in an allow-partial-radiation mode, allowing only a selected part of the electromagnetic radiation to pass through.

In the case of a pulsed laser, the allow-all mode of the laser energy control system 200 and the waveplate 220 is also an allow-all-pulses mode, allowing all laser pulses to pass through. In the case of a pulsed laser, the block-all mode of the laser energy control system 200 and the waveplate 220 is also a block-all-pulses mode, blocking all laser pulses from passing through. In the case of a pulsed laser, the allow-partial-radiation mode of the laser energy control system 200 and the waveplate 220 is also an allow-all-pulses mode but at reduced energy output, allowing only a selected part of the electromagnetic radiation of each laser pulse to pass through.

Figure 16:
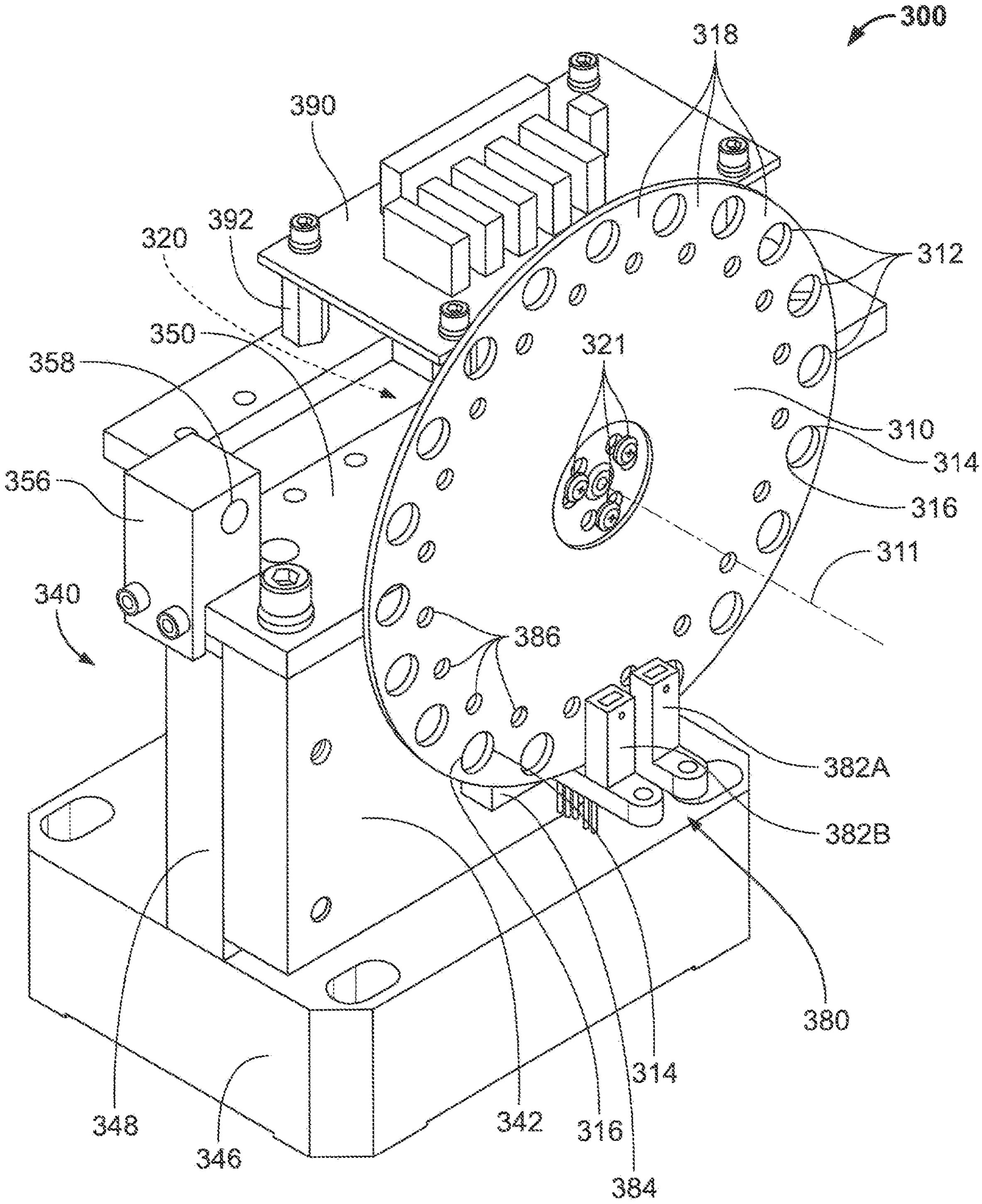
FIG. 16 shows a perspective view of another example laser shutter assembly in accordance with the disclosure.
Figure 17:
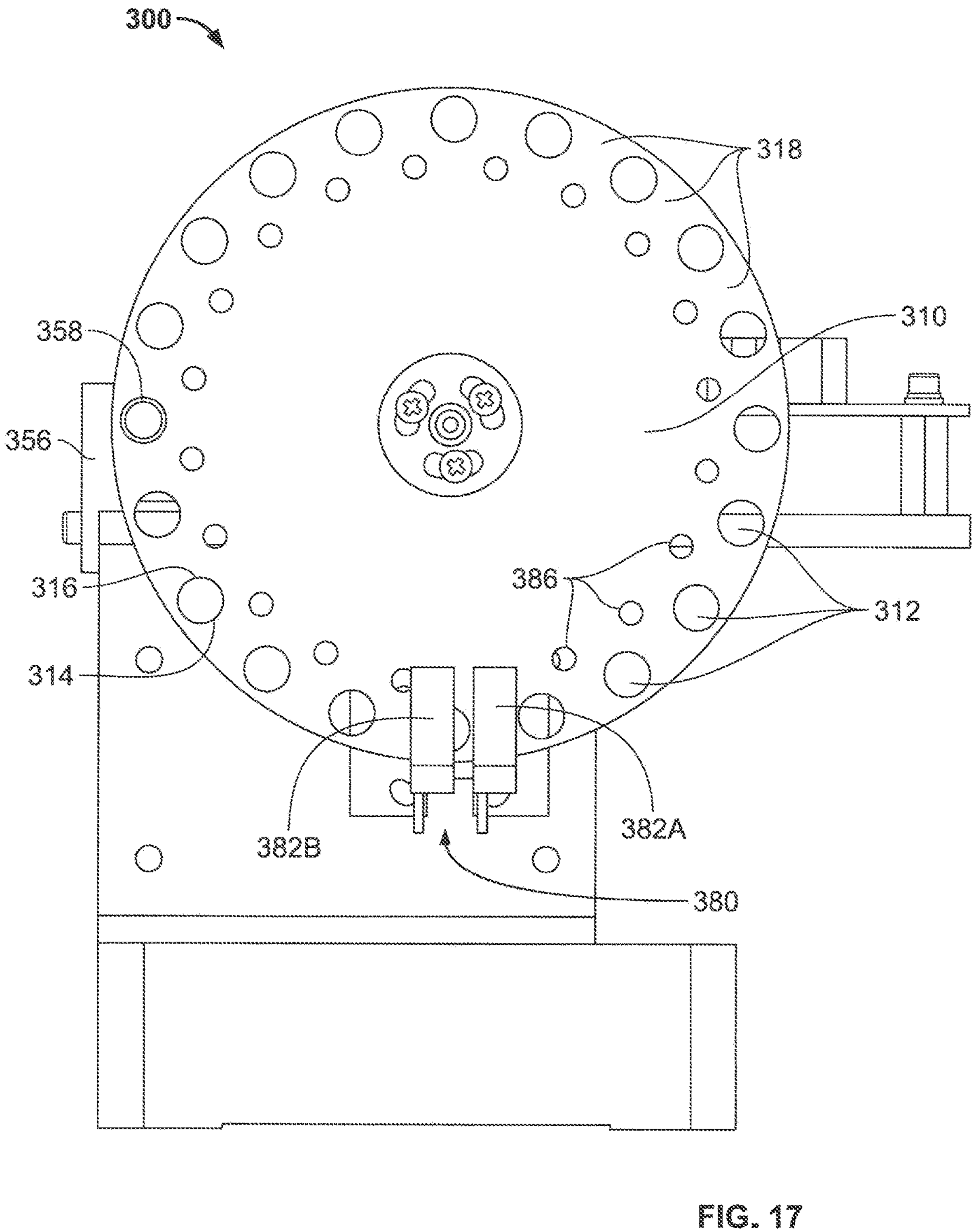
FIG. 17 shows a front view of the laser shutter assembly of FIG. 16.

FIGS. 16 and 17 show a laser shutter assembly 300 that may be used in a laser system such as the laser system 10 in FIG. 1. The laser shutter assembly 300 is capable of operating as a laser pulse selection system and/or a laser energy control system. The laser shutter assembly 300 may function as a laser pulse selection system like the laser pulse selection system 30 in FIG. 1, as a laser energy control system like the laser energy control system 40 in FIG. 1, or as both a laser pulse selection system 30 and a laser energy control system 40.

As shown in FIGS. 16 and 17, the example laser shutter assembly 300 comprises a rotatable shutter 310. As described in more detail below, the shutter 310 is used for selectively blocking laser electromagnetic radiation or allowing laser electromagnetic radiation to pass. The shutter 310 may selectively block pulses as well as parts of laser pulses, to function as an energy control system.

The shutter has a series of open areas 312 with solid areas 318 between open areas 312. Each open area 312 has a leading edge 314 and a trailing edge 316.

The shutter 310 is rotatable about an axis of rotation 311. The shutter 310 is rotatable with respect to a laser path, such that the open areas 312 and solid areas 318 are alternately positioned in the laser path. When an open area 312 is positioned in the laser path, the open area allows the laser electromagnetic radiation directed toward the open area 312 to pass through the open area 312. Like the open areas 112 described above, the open areas 312 may be open holes or gaps through the shutter 310. When a solid area 318 is positioned in the laser path, the solid area 318 blocks the laser electromagnetic radiation directed toward the solid area 318 from passing through the solid area 318.

In the illustrated example, the open areas 312 are completely bounded by structure of the shutter 310. In other embodiments, the open areas 312 may be unbounded on one or more sides or sections. For example, the open areas 312 may be notches, cutouts, or other suitable configurations. In one example, the shutter has a shape similar to a gear, with alternating open areas and solid areas around the perimeter of the shutter, giving the perimeter of the shutter a toothed profile.

In the illustrated example, the shutter 310 is in the form of a wheel or disk. However, the shutter 310 may take any other suitable form. For example, the shutter may be a plate with a non-circular perimeter, or may have a fan structure as described above, or be shaped like a block or barrel with openings such that it has alternating open areas and solid areas.

The laser shutter assembly 300 further comprises a shutter rotation motor 320 (hidden from view in FIGS. 16-17, but similar to shutter rotation motor 120) for rotating the shutter 310. The shutter rotation motor 320 may be, for example, a brushless DC motor, or any other suitable motor for rotating the shutter 310. The shutter 310 is coupled to the rotor of the shutter rotation motor 320 for rotation by the shutter rotation motor 320. The shutter 310 may be coupled directly to the rotor of the shutter rotation motor 320 or through one or more other components. Fasteners 321 may be used for coupling the shutter 310 to the shutter rotation motor 320, either directly or indirectly.

The laser shutter assembly 300 further comprises a support structure 340 for supporting the various parts of the system. In the illustrated example, the support structure 340 comprises a support structure component 342 in the form of a sensor holder, a support structure component 346 in the form of a baseplate, a support structure component 348 in the form of a plate connected to the baseplate 346, and a support structure component 350 in the form of a plate connected to the sensor holder 342. The support structure may have more or fewer components.

The support structure 340 supports the various parts of the system 300 for their respective positionings and functions. For example, the sensor holder 342 supports one or more sensors as described below. The baseplate 346 supports the plate 348 which supports the plate 342 which supports the plate 350 which in turn supports a beam path guide 356 for aligning with the laser beam path. The beam path guide 356 has a beam path guide opening 358 through which the laser beam passes when the system 300 is mounted with respect to a laser. The beam path guide 356 may be a bracket, block, plate, or other suitable structure. The baseplate 346 serves to align the beam path guide 356 laterally, i.e., in the directions of the plane of the baseplate 346, and the plate 348 serves to align the beam path guide 356 vertically, i.e., in the direction perpendicular to the plane of the baseplate 346. The plate 350 supports a PCB assembly 390 through support posts 392 and may support other components such as the shutter rotation motor 320.

The laser shutter assembly 300 further comprises a shutter rotation sensor assembly 380. The shutter rotation sensor assembly 380 serves to help ensure that the shutter 310 is rotating about its rotational axis at the desired timing. The shutter rotation sensor assembly 380 comprises one or more shutter rotation sensor(s) 382. In the illustrated example, the shutter rotation sensors 382 are slotted optical sensors, and two such shutter rotation sensor 382A, 382B are used, although more or fewer shutter rotation sensors 382 may be used. A support structure component 384 in the form of a bracket supports the shutter rotation sensor(s) 382. The bracket 384 may be attached to another component of the support structure 340 in a fixed position with respect to the rotational axis of the shutter 310.

The laser shutter assembly 300 may include computer and electrical components as known in the art for controlling the system 300. The computer components may include one or more processors, memory components, and hardware and/or software components. Some components such as integrated circuits may be supported on the PCB assembly 390, which is mounted on plate 350 through support posts 392.

In operation, the laser shutter assembly 300 is mounted as part of a laser system including a laser, such as the laser 20 in FIG. 1. The laser shutter assembly 300 is mounted with respect to the laser such that when the laser is in operation the laser beam will be selectively blocked or allowed to pass depending on the rotational position of the shutter 310. In the illustrated example, the laser shutter assembly 300 is mounted with respect to the laser such that when the laser is in operation the laser beam passes through the beam path guide opening 358 of the beam path guide 356. The laser shutter assembly 300 may be mounted with respect to the laser such that when the laser is in operation the laser beam passes through the shutter 310 before passing through the beam path guide opening 358 of the beam path guide 356. Alternatively, the laser shutter assembly 300 may be mounted with respect to the laser such that when the laser is in operation the laser beam passes through the beam path guide opening 358 of the beam path guide 356 before passing through the shutter 310.

Laser electromagnetic radiation that is allowed to pass through the laser shutter assembly 300 will continue toward the output of the laser system. Such laser electromagnetic radiation may continue to one or more other components of the laser system before the output of the laser system.

As described above, the laser of the laser system may be operated to emit electromagnetic energy in pulses, such that the shutter 310 serves to selectively block or allow to pass certain laser pulses from the laser. Alternatively, the laser may be operated to emit electromagnetic energy continuously, such that the shutter 310 serves to selectively block the laser beam or allow the laser beam to pass, thereby creating a pulsed or intermittent output from the laser shutter assembly 300.

With a pulsed laser, depending on input selecting the mode of operation, which may be through user control or through automatic control, the shutter 310 may be made to rotate in an allow-all-pulses mode that allows all laser pulses to pass through (in whole or in part), a block-all-pulses mode that blocks all laser pulses in their entirety, or an intermittently-block-pulses mode that allows some laser pulses to pass through in whole or in part and blocks other laser pulses in their entirety. The intermittently-block-pulses mode is a mode in which the shutter 310 is rapidly switched back-and-forth between an allow-all-pulses mode and a block-all-pulses mode. For example, the shutter 310 can be operated in an allow-all-pulses mode for a series of consecutive pulses, switched to operate in a block-all-pulses mode for a series of consecutive pulses, and rapidly switched back and forth between these two conditions. In this way, the shutter 310 can be operated to select specific percentages of pulses to pass through.

To give one of many possible examples, in one embodiment the laser may emit pulses at a frequency of 900 pulses per second. The shutter 310 may be configured, for example, with 20 open areas 312 evenly spaced around the center of the shutter 310, with solid areas 318 between them. The shutter 310 may be operated to rotate at 2700 revolutions per minute, which is 45 revolutions per second. With these specifications, the laser will emit 20 pulses in each revolution of the shutter 310. In one operating mode, the allow-all-pulses mode, the shutter 310 may be rotated such that an open area 312 aligns with the laser beam path at each laser pulse, allowing all of the laser pulses to pass through (in whole or in part). In another operating mode, the block-all-pulses mode, the shutter 310 may be rotated such that a solid area 318 between open areas 312 aligns with the laser beam path at each laser pulse, thereby blocking all of the laser pulses in their entirety. In the intermittently-block-pulses mode(s), the system rapidly switches back and forth between the allow-all-pulses mode and the block-all-pulses mode. For example, the shutter 310 can be operated in an allow-all-pulses mode for a series of consecutive pulses, for example for one to nineteen pulses, switched to operate in a block-all-pulses mode for a series of consecutive pulses, for example the remainder of the pulses in a revolution of the shutter 310, and rapidly switched back and forth between these two conditions. In this way, the shutter 310 can be operated to select specific percentages of pulses to pass through.

Many other variations are possible. The laser may emit pulses at any frequency suitable for a particular application and may switch frequencies in operation. The shutter 310 may be operated to rotate at any suitable speed and may switch speeds in operation. The laser may emit any suitable number of pulses in each revolution of the shutter 310. The open area(s) 312 and solid area(s) 318 may have any suitable geometry. Any operating position may allow any suitable number of pulses to pass while also blocking any suitable number of pulses. The laser also may emit continuous electromagnetic energy, in which case the positioning of the shutter 310 may be operated to generate a pulsed output.

The laser shutter assembly 300 may also be used as a laser energy control system. With a pulsed laser, the rotation of the shutter 310 can be synchronized with the laser pulses such that the center of the laser beam is misaligned with the center of the open areas 312, such that only part of the laser beam is able to pass through the open areas 312 while the remaining part of the laser beam is blocked by the solid areas 318 at the edges of the open areas 318. By adjusting the amount of misalignment, the laser shutter assembly 300 can be synchronized to allow any desired percentage of laser energy to pass through, for example 50%, 75%, etc. Thus, when the laser shutter assembly 300 is operated in this way, it is operated in an allow-partial-radiation mode in which only part of the laser beam is able to pass through the open areas 312 while the remaining part of the laser beam is blocked by the solid areas 318 at the edges of the open areas 318.

The laser shutter assembly 300 may be operated as both a laser pulse selection system and a laser energy control system. During some parts of the operation, the rotation of the shutter 310 may be operated in the energy control or allow-partial-radiation mode, such that for a set of one or more consecutive pulses, part of the laser beam is able to pass through the open areas 312 and part of the laser beam is blocked by the solid areas 318 at the edges of the open areas 318. During this energy control or allow-partial-radiation mode, the functioning can be rapidly switched back and forth between an allow-all-pulses mode, in which a part of each laser pulse in a set of one or more consecutive pulses is allowed to pass through, and a block-all-pulses mode, in which each laser pulse in a set of one or more consecutive pulses is blocked entirely. The laser shutter assembly 300 also can be maintained for a desired period of time in an energy-control mode in which all of the laser pulses are allowed to pass with reduced energy output.

Thus, when the laser is operated to emit electromagnetic energy in pulses, the allow-all-pulses mode of the laser shutter assembly 300 may be either an allow-all-radiation mode, allowing all electromagnetic radiation of each laser pulse to pass through, or an allow-partial-radiation mode, allowing only partial electromagnetic radiation of each laser pulse to pass through. When the laser is operated to emit electromagnetic energy in pulses, the block-all-pulses mode of the laser shutter assembly 300 is also a block-all-radiation mode, blocking all electromagnetic radiation from passing through. When the laser is operated to emit electromagnetic energy in pulses, the intermittently-block-pulses mode of the laser shutter assembly 300 is also an allow-partial-radiation mode, allowing only a selected part of the electromagnetic radiation to pass through, by allowing only some of the laser pulses through (in whole or in part).

When the laser is operated to emit electromagnetic energy continuously, the open areas 312 and the solid areas 318 of the shutter 310 alternately pass in front of the laser beam. Thus, when the laser is operated to emit electromagnetic energy continuously, the laser shutter assembly 300 is in both a pulse-creating-mode, generating a pulsed or intermittent output, and an allow-partial-radiation mode, allowing only a selected part of the electromagnetic radiation to pass through.

The laser shutter assembly 300 may use the shutter rotation sensor assembly 380 to help ensure that the shutter 310 is rotating at the desired timing. This may include helping ensure that the shutter 310 is rotating at the desired rotational speed and/or helping ensure that the shutter 310 is phase-locked with the frequency of a pulsed laser, such that the open areas 312, solid areas 318, or parts of each are aligned with the laser path at the desired time.

Like the shutter rotation sensor 182, the shutter rotation sensors 382 are optical sensors, with a light source such as an LED on one side of the shutter 310 and a photodetector on the opposite side of the shutter 310. In this example, the shutter 310 has a series of sensor opening 386. The sensor openings 386 are arranged in a circular path such that they pass between the light source and photodetector of the each of the shutter rotation sensors 382. When a sensor opening 386 of the shutter 310 is positioned between the light source and photodetector of a shutter rotation sensor 382, the light is able to pass through the opening 386 and is detected by the photodetector. Alternatively, when a solid area 318 between the openings 386 of the shutter 310 is positioned between the light source and photodetector of the shutter rotation sensor 382, the light is blocked and not detected by the photodetector. In an example, one shutter rotation sensor, 382A or 382B, may be arranged to correspond to a sensor opening 386 when an open area 312 is aligned with the laser path, while the other shutter rotation sensor, 382B or 382A, may be arranged to correspond to a sensor opening 386 when a solid area 318 between open areas 312 is aligned with the laser path.

In an example, the system may calibrate the rotational timing of the shutter 310 by operating the shutter rotation motor 320 to rotate the shutter 310 and by using the shutter rotation sensor(s) 382 to detect its rotation. The shutter rotation sensor(s) 382 may be used to detect an opening 386 or a leading edge or a trailing edge of an opening 386. The detection may be used to detect the rotational speed of the shutter 310 and to adjust the shutter rotation motor 320 to adjust the rotational speed of the shutter 310. The detection also may be used to adjust the shutter rotation motor 320 to adjust the rotation of the shutter 310 so that it is phase-locked with a pulsed laser, so that the desired number of pulses are blocked and permitted to pass, and/or so that the desired amount of laser energy is permitted to pass.

In some embodiments, a laser system as described herein may be used for cataract surgery. In some embodiments, the output energy of the laser system may be used for fragmentation or phacoemulsification a cataractous lens. In some examples, the laser output may be used for initial fragmentation of the cataractous lens, followed by phacoemulsification of the lens using an ultrasonic handpiece to complete the breakdown of the lens for removal. In other examples, the laser output may be used for fragmentation or phacoemulsification of the lens to a sufficient degree for removal of the lens without the need for a separate application of ultrasonic energy. Additionally or alternatively, the laser output may be suitable for making corneal incisions and/or for opening the lens capsule.

In other embodiments, the laser system may be suitable for vitreoretinal surgery. In some embodiments, the output energy of the laser system may be suitable for severing or breaking vitreous fibers for removal. In other vitreoretinal applications, the laser output may be suitable for ophthalmic tissue treatment, such as photocoagulation of retinal tissue to treat issues such as retinal tears and/or the effects of diabetic retinopathy.

In one example, the laser operates in the infrared range. For example, the laser may output electromagnetic radiation in the mid-infrared range, for example in a wavelength range of about 2.0 microns to about 4.0 microns. Some examples wavelengths include about 2.5 microns to 3.5 microns, such as about 2.775 microns, about 2.8 microns, or about 3.0 microns. Such a laser may be suitable, for example, for lens fragmentation in cataract surgery, or for other procedures. In another example, the laser emits electromagnetic radiation in the ultraviolet range. In another example, the laser emits electromagnetic radiation in the visible range.

The ability to selectively block laser pulses and/or to control the laser output energy is useful for procedures in which laser control is advantageous. For example, in cataract surgery, it may be desirable to operate the laser system with high power for initially breaking up the lens but with lower power for breaking up smaller pieces. Pulse number control and pulse energy level control of a laser beam allows for a correct level of force to be applied to smaller particles which might otherwise be pushed away before they can be aspirated out of the eye by the irrigation system of the hand piece.

As would be understood by persons of ordinary skill in the art, systems and methods as disclosed herein have advantages over prior systems and methods. For example, in some prior systems and methods, selecting pulses can require a large amount of power and can result in an undesired loss of laser power. Pockels cells systems use crystals that rotate the polarity of the laser beam by applying high voltage to the crystals. The high voltage can vary from 0 to 6.5 KV based on the amount of polarity rotation needed. By contrast, systems and methods as described herein can select laser pulses with low power use and with no or essentially no undesired loss of laser power. Furthermore, the cost of systems as described herein may be substantially less than certain other systems, in some cases less than a third of the cost of certain other systems. Also, in some embodiments, no high voltage is needed, which improves electromagnetic compatibility for the system.

Persons of ordinary skill in the art will appreciate that the embodiments encompassed by the disclosure are not limited to the particular example embodiments described above. While illustrative embodiments have been shown and described, a wide range of modification, change, and substitution is contemplated in the foregoing disclosure. It is understood that such variations may be made to the foregoing without departing from the scope of the disclosure. Accordingly, it is appropriate that the appended claims be construed broadly and in a manner consistent with the disclosure.

What is claimed is:

1. A laser system comprising:

a laser configured to emit electromagnetic radiation; and a laser shutter assembly, wherein the laser shutter assembly comprises:

a shutter, the shutter having an axis of rotation and at least one open area and at least one solid area arranged around the axis of rotation of the shutter; and a shutter rotation motor configured to rotate the shutter around the axis of rotation of the shutter, wherein the shutter is arranged such that, when rotated around the axis of rotation of the shutter, an open area of the shutter and a solid area of the shutter are alternately positioned in a path of the electromagnetic radiation emitted by the laser, wherein the shutter comprises a plurality of tracks corresponding to its different positions, including a first track in which a first percentage of laser pulses emitted by the laser are allowed to pass through and a second track in which a second percentage of laser pulses emitted by the laser are allowed to pass through, wherein the second percentage is higher than the first percentage.

2. The laser system as recited in claim 1, wherein the laser is configured to emit electromagnetic radiation in pulses, and wherein the laser shutter assembly is configured to operate in different modes, including an allow-all-pulses mode in which all laser pulses are allowed to pass through in whole or in part, a block-all-pulses mode in which the shutter blocks all laser pulses from passing through, and at least one intermittently-block-pulses mode in which some laser pulses are allowed to pass through in whole or in part and some laser pulses are blocked by the shutter.

3. The laser system as recited in claim 2, wherein the laser shutter assembly further comprises a shutter rotation sensor, and wherein the laser system is configured to operate the shutter rotation motor in response to signals from the shutter rotation sensor to control the rotation of the shutter with respect to the timing of the laser pulses.

4. The laser system as recited in claim 2, wherein the laser shutter assembly comprises a carriage position motor operatively connected to the shutter and configured to move the shutter into different positions corresponding to the different operating modes of the laser shutter assembly.

5. The laser system as recited in claim 4, wherein the laser shutter assembly further comprises a carriage cam plate and at least one carriage position sensor, wherein the carriage cam plate is connected to the shutter to move with the shutter, and wherein the at least one carriage position sensor is configured to detect a position of the carriage cam plate to determine a position of the shutter.

6. The laser system as recited in claim 2, wherein the laser system is configured to operate the shutter rotation motor to control the rotation of the shutter with respect to the timing of the laser pulses in order to operate the laser shutter assembly in its different modes.

7. The laser system as recited in claim 2, wherein the laser system is configured to operate the shutter rotation motor to control the rotation of the shutter with respect to the laser pulses such that, for at least a set of laser pulses, a part of each of the laser pulses in the set of laser pulses is allowed to pass and a part of each of the laser pulses in the set of laser pulses is blocked, in order to control laser energy output.

8. A method of controlling a laser system comprising: emitting electromagnetic radiation from a laser; and rotating a shutter in a path of the electromagnetic radiation emitted by the laser whereby an open area of the shutter and a solid area of the shutter are alternately positioned in the path of the electromagnetic radiation emitted by the laser, wherein the shutter comprises a plurality of tracks corresponding to its different positions, including a first track in which a first percentage of laser pulses emitted by the laser are allowed to pass through and a second track in which a second percentage of laser pulses emitted by the laser are allowed to pass through, wherein the second percentage is higher than the first percentage.

9. The method of controlling a laser system as recited in claim 8, wherein the step of emitting electromagnetic radiation from the laser comprises emitting electromagnetic radiation from the laser in pulses, and further comprising operating the shutter in different modes, including an allow-all-pulses mode in which all laser pulses are allowed to pass through in whole or in part, a block-all-pulses mode in which the shutter blocks all laser pulses from passing through, and at least one intermittently-block-pulses mode in which some laser pulses are allowed to pass through in whole or in part and some laser pulses are blocked by the shutter.

10. The method of controlling a laser system as recited in claim 9, further comprising operating the shutter in response to signals from a shutter rotation sensor to control the rotation of the shutter with respect to the timing of the laser pulses.

11. The method of controlling a laser system as recited in claim 9, further comprising moving the shutter into different positions corresponding to the different operating modes using a carriage position motor operatively connected to the shutter.

12. The method of controlling a laser system as recited in claim 11, wherein the step of moving the shutter into different positions comprises moving the shutter into a first position in which the first percentage of the laser pulses emitted by the laser are allowed to pass through and into a second position in which the second percentage of the laser pulses emitted by the laser are allowed to pass through.

13. The method of controlling a laser system as recited in claim 11, further comprising determining a position of the shutter by detecting a position of a carriage cam plate using at least one carriage position sensor, wherein the carriage cam plate is connected to the shutter to move with the shutter.

14. The method of controlling a laser system as recited in claim 9, further comprising controlling the rotation of the shutter with respect to the timing of the laser pulses in order to operate the shutter in its different modes.

15. The method of controlling a laser system as recited in claim 9, further comprising controlling the rotation of the shutter with respect to the laser pulses such that, for at least a set of laser pulses, a part of each of the laser pulses in the set of laser pulses is allowed to pass and a part of each of the laser pulses in the set of laser pulses is blocked, in order to control laser energy output.

* * * * *